(12) United States Patent
Tomita et al.

(10) Patent No.: US 9,523,433 B2
(45) Date of Patent: Dec. 20, 2016

(54) PRESSURE CONTROL VALVE

(71) Applicant: DENSO CORPORATION, Kariya, Aichi-pref. (JP)

(72) Inventors: Masahiro Tomita, Obu (JP); Keita Okada, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 364 days.

(21) Appl. No.: 13/965,545

(22) Filed: Aug. 13, 2013

(65) Prior Publication Data
US 2014/0054485 A1  Feb. 27, 2014

(30) Foreign Application Priority Data

Aug. 24, 2012  (JP) ................. 2012-185171

(51) Int. Cl.
| F16K 3/30 | (2006.01) |
| F16K 31/06 | (2006.01) |
| F16K 27/04 | (2006.01) |
| G05D 16/20 | (2006.01) |

(52) U.S. Cl.
CPC ............. *F16K 3/30* (2013.01); *F16K 27/048* (2013.01); *F16K 31/0613* (2013.01); *G05D 16/2013* (2013.01)

(58) Field of Classification Search
CPC ...... F16K 3/30; F16K 27/048; F16K 31/0613; G05D 16/2013
USPC ........................................ 411/168, 213, 411
See application file for complete search history.

(56) References Cited

U.S. PATENT DOCUMENTS

| 3,467,157 A | * | 9/1969 | La Torre | ............... F16B 39/284 |
| | | | | 411/168 |
| 4,983,084 A | * | 1/1991 | Gray | ....................... F16B 19/05 |
| | | | | 411/311 |
| 5,259,414 A | * | 11/1993 | Suzuki | ..................... 137/625.65 |
| 2013/0004262 A1 | * | 1/2013 | Rosenkranz et al. | ......... 411/411 |

FOREIGN PATENT DOCUMENTS

| EP | 2 282 091 | 2/2011 |
| JP | 9-166238 | 6/1997 |
| JP | 2011-33181 | 2/2011 |

OTHER PUBLICATIONS

Office Action (3 pages) dated Sep. 29, 2014, issued in corresponding Korean Application No. 10-2013-0100319 and English translation (3 pages).

* cited by examiner

*Primary Examiner* — Marina Tietjen
*Assistant Examiner* — Daphne M Barry
(74) *Attorney, Agent, or Firm* — Nixon & Vanderhye P.C.

(57) ABSTRACT

An adjust screw is inserted into a receiving hole of a sleeve to adjust and maintain a set load of the spring in a state where a male-threaded portion of the adjust screw is engaged with a female-threaded portion of the sleeve. One or more wall sections of the sleeve is plastically deformed in a radially inward direction and is pressed against a predetermined portion of an outer peripheral surface of the adjust screw, which is other than the male-threaded portion, to limit rotation of the adjust screw.

15 Claims, 16 Drawing Sheets

AXIAL DIRECTION
ONE END SIDE ⟵――――――⟶ OTHER END SIDE

AXIAL DIRECTION
ONE END SIDE ←————————→ OTHER END SIDE

SIDE OPPOSITE FROM SPRING ←— AXIAL DIRECTION —→ SPRING SIDE

SIDE OPPOSITE FROM SPRING ←AXIAL DIRECTION→ SPRING SIDE

SIDE OPPOSITE FROM SPRING ←AXIAL DIRECTION→ SPRING SIDE

SIDE OPPOSITE FROM SPRING ← AXIAL DIRECTION → SPRING SIDE

F1>F2

SIDE OPPOSITE FROM SPRING ← AXIAL DIRECTION → SPRING SIDE

F1=0

SIDE OPPOSITE FROM SPRING ← AXIAL DIRECTION → SPRING SIDE

SIDE OPPOSITE FROM SPRING ←——→ SPRING SIDE
AXIAL DIRECTION

SIDE OPPOSITE FROM SPRING ←——→ SPRING SIDE
AXIAL DIRECTION

SIDE OPPOSITE FROM SPRING ←AXIAL DIRECTION→ SPRING SIDE

SIDE OPPOSITE FROM SPRING ←AXIAL DIRECTION→ SPRING SIDE

PRESSURE CONTROL VALVE

CROSS REFERENCE TO RELATED APPLICATION

This application is based on and incorporates herein by reference Japanese Patent Application No. 2012-185171 filed on Aug. 24, 2012.

TECHNICAL FIELD

The present disclosure relates to a pressure control valve.

BACKGROUND

For example, JPH09-166238A teaches a solenoid valve, which serves as a pressure control valve. With reference to FIG. 15, the solenoid valve of JPH09-166238A includes a spool 110, which is received in a sleeve 100 and is reciprocatable in an axial direction. A spring 120 urges the spool 110 toward a side (the right side in FIG. 15) against a drive force of a solenoid device (drive device). The solenoid valve further includes an adjust screw 130. With reference to FIG. 16, a male-threaded portion 130a is formed in an outer peripheral surface of the adjust screw 130 and is engaged with a female-threaded portion 100a of the sleeve 100, which is formed in one end part of an inner peripheral surface of the sleeve 100. A set load of the spring 120 is adjusted by adjusting the amount of insertion of the adjust screw 130 into the sleeve 100.

A rotational force is applied to the adjust screw 130 from a jig (not shown) to adjust the set load of the spring 120. Thereafter, a pin 140 (see FIG. 18) is inserted into a through-hole 101, which radially extends through a peripheral wall of the sleeve 100, to plastically deform a crest 130ac of the male-threaded portion 130a of the adjust screw 130 in a radially inner direction. When the crest 130ac of the male-threaded portion 130a is plastically deformed, i.e., compressed in the radially inner direction by the pin 140, rotation of the adjust screw 130 is limited to fasten the adjust screw 130 in place. Thereby, the installation position of the adjust screw 130 is fixed.

Hereinafter, the step of adjusting the set load of the spring 120 through application of the rotational force to the adjust screw 130 with the jig will be referred to as a pressure adjusting step.

JP2011-33181A teaches another technique. Specifically, with reference to FIGS. 20 and 21, a sealing material is filled in a space located on a rear side of the adjust screw 130, which is opposite from the spring 120 in the axial direction. When the sealing material is solidified, loosening of the adjust screw 130 is limited.

When the pressure adjusting step is executed, the adjust screw 130 receives an axial load F1 of the jig, which applies the rotational force to the adjust screw 130, and a reaction force F2 of the spring 120.

With reference to FIG. 16, the female-threaded portion 100a of the sleeve 100 has a first flank 100a1 and a second flank 100a2. The first flank 100a1 is located on one side of a crest 100ac of the female-threaded portion 100a, which is opposite from the spring 120 in the axial direction. The second flank 100a2 is located on the other side of the crest 100ac of the female-threaded portion 100a, which is opposite from the one side of the crest 100ac of the female-threaded portion 100a in the axial direction. Furthermore, the male-threaded portion 130a of the adjust screw 130 has a first flank 130a1 and a second flank 130a2. The first flank 130a1 is located on one side of a crest 130ac of the male-threaded portion 130a, which is opposite from the spring 120 in the axial direction. The second flank 130a2 is located on the other side of the crest 130ac of the male-threaded portion 130a, which is opposite from the one side of the crest 130ac of the male-threaded portion 130a in the axial direction. Normally, the pressure adjusting step is executed in a state where a condition of F1>F2 is satisfied. In this state, as shown in FIG. 17A, the adjust screw 130 is urged toward the spring 120, and thereby the second flank 130a2 of the male-threaded portion 130a contacts the first flank 100a1 of the female-threaded portion 100a on the spring 120 side of the crest 130ac of the male-threaded portion 130a. Furthermore, a pitch clearance is formed between the first flank 130a1 of the male-threaded portion 130a and the second flank 100a2 of the female-threaded portion 100a on the opposite side of the crest 130ac of the male-threaded portion 130a, which is opposite from the spring 120 side in the axial direction.

Thereafter (i.e., after the execution of the pressure adjusting step), when the axial load F1 of the jig applied against the adjust screw 130 is removed, the adjust screw 130 is moved toward the left side (the opposite side, which is opposite from the spring 120 in the axial direction) by the reaction force of the spring 120. That is, the position of the adjust screw 130 relative to the sleeve 100 is deviated toward the opposite side, which is opposite from the spring 120 in the axial direction. Therefore, the first flank 130a1 of the male-threaded portion 130a contacts the second flank 100a2 of the female-threaded portion 100a on the opposite side of the crest 130ac, which is opposite from the spring 120 side in the axial direction. Furthermore, a pitch clearance is formed between the second flank 130a2 of the male-threaded portion 130a and the first flank 100a1 of the female-threaded portion 100a on the spring 120 side of the crest 130ac of the male-threaded portion 130a. When the crest 130ac of the male-threaded portion 130a of the adjust screw 130 is plastically deformed in the radially inner direction by the pin 140, the adjust screw 130 may be fastened in the state where the position of the adjust screw 130 is deviated from its preset position relative to the sleeve 100 in the axial direction. Therefore, in such a case, the set load of the spring 120 is changed to cause the pressure adjustment deviation.

Specifically, at the time of plastically deforming the crest 130ac of the male-threaded portion 130a of the adjust screw 130 with the pin 140, an axial force component f1 of the plastically deforming force is applied from the pin 140 to the first flank 130a1 located on the opposite side of the crest 130ac, which is opposite from the spring 120 side in the axial direction, and an axial force component f2 of the plastically deforming force is applied from the pin 140 to the second flank 130a2 located on the spring 120 side of the crest 130ac. The relationship between the axial force component f1 and the axial force component f2 will be one of f1>f2 and f1<f2 depending on the axial position of the adjust screw 130 relative to the pin 140. That is, at the time of plastically deforming the crest 130ac of the male-threaded portion 130a of the adjust screw 130 in the radially inward direction with the pin 140, when the axial force component f1, which is applied from the pin 140 to the first flank 130a1 of the male-threaded portion 130a, is smaller than the axial force component f2 of the plastically deforming force, which is applied from the pin 140 to the second flank 130a2 of the male-threaded portion 130a (i.e., f1<f2), as shown in FIG. 18, the adjust screw 130 is fastened to the sleeve 100 in the state (i.e., the state of FIG. 17B) where the first flank 130a1 of the male-threaded portion 130a contacts the second flank 100a2 of the female-threaded portion 100a on the opposite side of the crest 130ac, which is opposite from the spring 120 side in the axial direction. Therefore, the set load of the spring 120 is changed by the amount, which corresponds to the pitch clearance, thereby resulting in the pressure adjustment deviation.

In contrast, when the axial force component f1, which is applied from the pin 140 to the first flank 130a1 of the male-threaded portion 130a, is larger than the axial force component f2 of the plastically deforming force, which is applied from the pin 140 to the second flank 130a2 of the male-threaded portion 130a (i.e., f1>f2), as shown in FIG. 19, the adjust screw 130 is moved toward the spring 120 side (the side where the pitch clearance is formed). At this time, the amount of displacement of the adjust screw 130 cannot be accurately controlled. In other words, the amount of displacement of the adjust screw 130 changes depending on the axial force components f1, f2 of the plastically deforming force. Therefore, the axial positional deviation of the adjust screw 130 cannot be reliably limited. Therefore, the set load of the spring 120 is changed to cause the pressure adjustment deviation.

Furthermore, according to the technique of JP2011-33181A, when the jig is removed to fill the seal material in the space located on the rear side of the adjust screw 130 (the side opposite from the spring 120 in the axial direction) after the execution of the pressure adjusting step, the adjust screw 130 is urged backward by the reaction force of the spring 120, as shown in FIG. 20. Therefore, the first flank 130a1 of the male-threaded portion 130a of the adjust screw 130 contacts the second flank 100a2 of the female-threaded portion 100a of the sleeve 100 on the opposite side of the crest 130ac of the male-threaded portion 130a, which is opposite from the spring 120 side in the axial direction, and the pitch clearance is formed between the second flank 130a2 of the male-threaded portion 130a and the first flank 100a1 of the female-threaded portion 100a on the spring 120 side of the crest 130ac of the male-threaded portion 130a. Thereafter, when the seal material is filled in the space located on the rear side of the adjust screw 130, the filling pressure of the seal material is applied to the rear surface of the adjust screw 130. Therefore, as shown in FIG. 21, the adjust screw 130 is moved toward the spring 120 side. However, the amount of displacement of the adjust screw 130 may vary. Therefore, in such a case, the pressure adjustment deviation may occur.

As discussed above, in the techniques of JPH09-166238A and JP2011-33181A, the adjust screw 130 may possibly be displaced in the axial direction by the amount, which corresponds to the pitch clearance, at the time of fixing the installation position of the adjust screw 130 relative to the sleeve 100 (i.e., at the time of limiting the rotation of the adjust screw 130 relative to the sleeve 100) after the execution of the pressure adjusting step. Therefore, the accurate adjustment of the set load of the spring 120 is difficult.

SUMMARY

The present disclosure is made in view of the above points. According to the present disclosure, there is provided a pressure control valve, which includes a valve housing, a valve element, a drive device, a spring and an adjust screw. The valve housing is configured into a tubular form. The valve housing has a receiving hole that extends in an axial direction of the valve housing, and a female-threaded portion is formed in an inner peripheral surface of the receiving hole. The valve element is received in the receiving hole and is reciprocatable in the axial direction. The drive device is configured to drive the valve element in the axial direction toward one end of the receiving hole. The spring urges the valve element in the axial direction toward the other end of the receiving hole, which is opposite from the one end of the receiving hole in the axial direction. The adjust screw has a male-threaded portion, which is formed in an outer peripheral surface of the adjust screw. The adjust screw is inserted into the receiving hole to adjust and maintain a set load of the spring in a state where the male-threaded portion is engaged with the female-threaded portion. The adjust screw is placed in the receiving hole on one axial side of the spring where the one end of the receiving hole is located. At least one wall section of the valve housing is plastically deformed in a radially inward direction and is pressed against a predetermined portion of the outer peripheral surface of the adjust screw, which is other than the male-threaded portion, to limit rotation of the adjust screw.

BRIEF DESCRIPTION OF THE DRAWINGS

The drawings described herein are for illustration purposes only and are not intended to limit the scope of the present disclosure in any way.

DETAILED DESCRIPTION

Various embodiments of the present disclosure will be described with reference to the accompanying drawings.

First Embodiment

In a first embodiment, a solenoid valve (a pressure control valve) of the present disclosure is applied as a hydraulic pressure control valve 1, which is used in a hydraulic pressure control apparatus of an automatic transmission of a vehicle.

Figure 1:
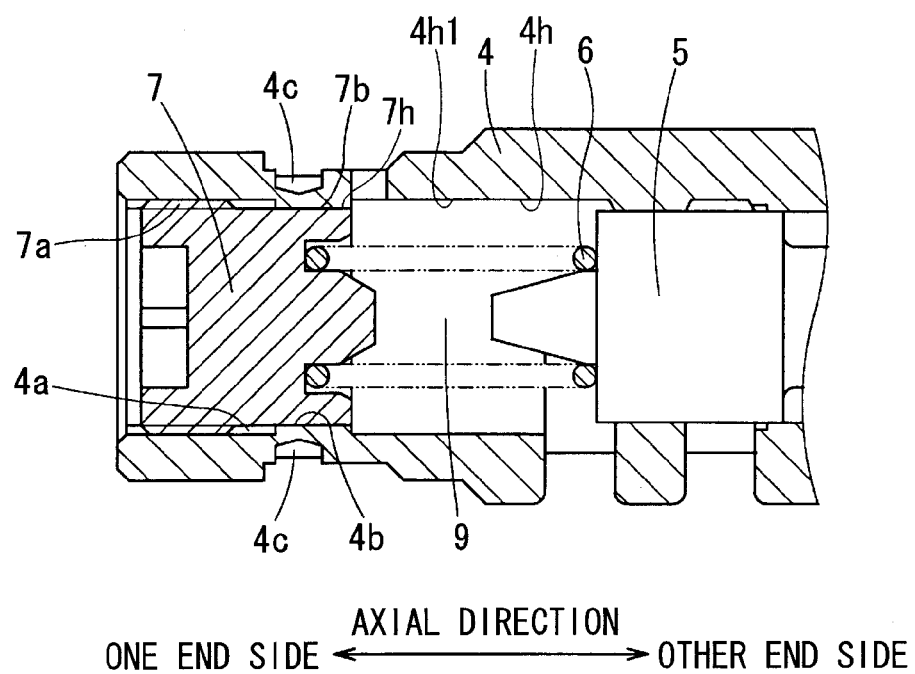
FIG. 1 is a partial cross-sectional view of a spool valve, which includes an adjust screw, according to a first embodiment of the present disclosure.
Figure 2:
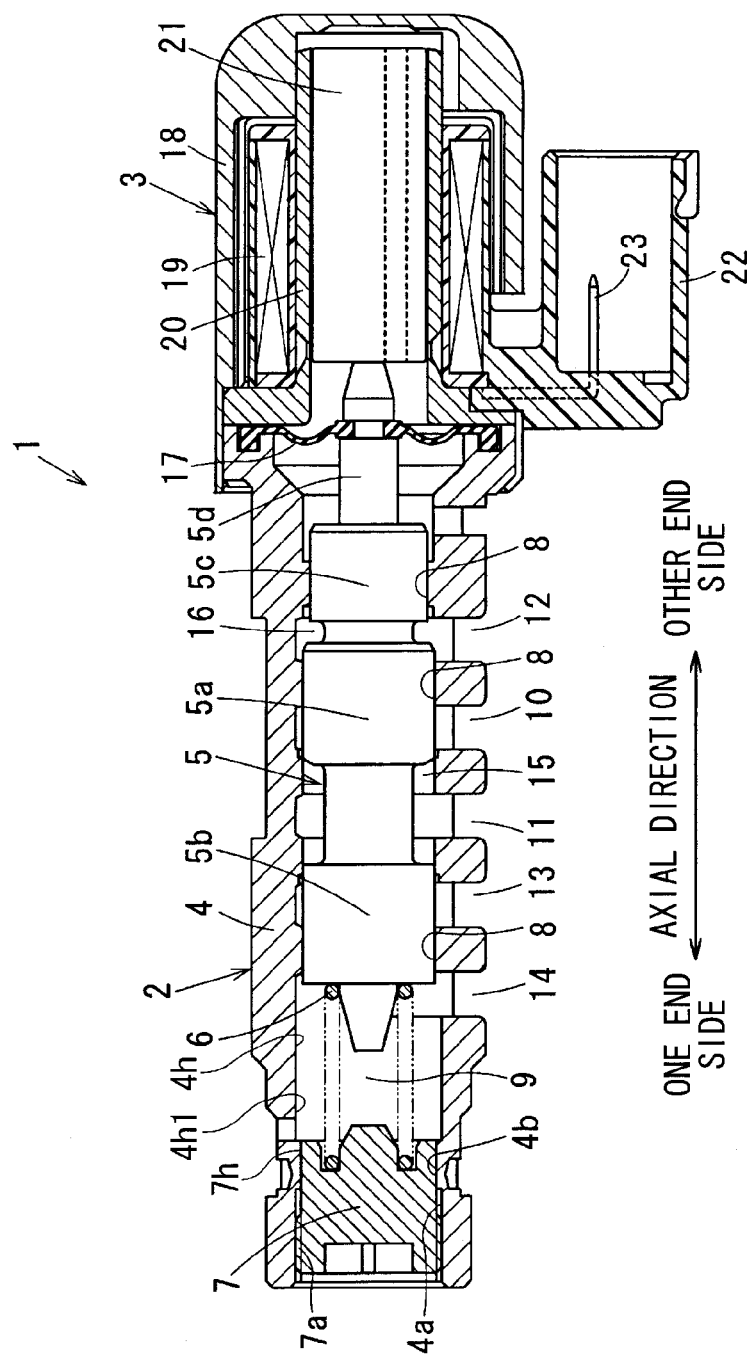
FIG. 2 is a cross-sectional view of a hydraulic control valve according to the first embodiment.

As shown in FIG. 2, the hydraulic pressure control valve 1 includes a spool valve 2 and a solenoid device (drive device) 3. The spool valve 2 adjusts the hydraulic pressure, and the solenoid device 3 controls the operation of the spool valve 2.

The spool valve 2 includes a sleeve 4, a spool 5, a spring 6 and a adjust screw 7. The sleeve 4 serves as a valve housing and is configured into a tubular form. The spool 5 is received in a receiving hole (cylindrical hole) 4h of the sleeve 4, which extends in an axial direction of the sleeve 4. The spool 5 is configured to reciprocate in the axial direction i.e., is reciprocatable in the axial direction.

Hereinafter, a left side in the axial direction in FIG. 2, which is opposite from the solenoid device 3, will be referred to as "one end side", and a right side in the axial direction in FIG. 2 will be referred to as "the other end side."

The sleeve 4 is made of a metal material. More specifically, in this instance, the sleeve 4 is made from an aluminum material through, for example, an aluminum die casting process. The receiving hole 4h is formed as a stepped receiving hole and extends through the sleeve 4 in the axial direction. A female-threaded portion (or simply referred to as a female thread) 4a is formed in an inner peripheral surface 4h1 of the receiving hole 4h of the sleeve 4 to threadably engage with the adjust screw 7. Furthermore, a spring chamber 9 and a slide hole 8 are formed in the receiving hole 4h of the sleeve 4 on the other end side of the female-threaded portion 4a in the axial direction. The spring 6 is received in the spring chamber 9, and the slide hole 8 slidably receives the spool 5.

Figure 3:
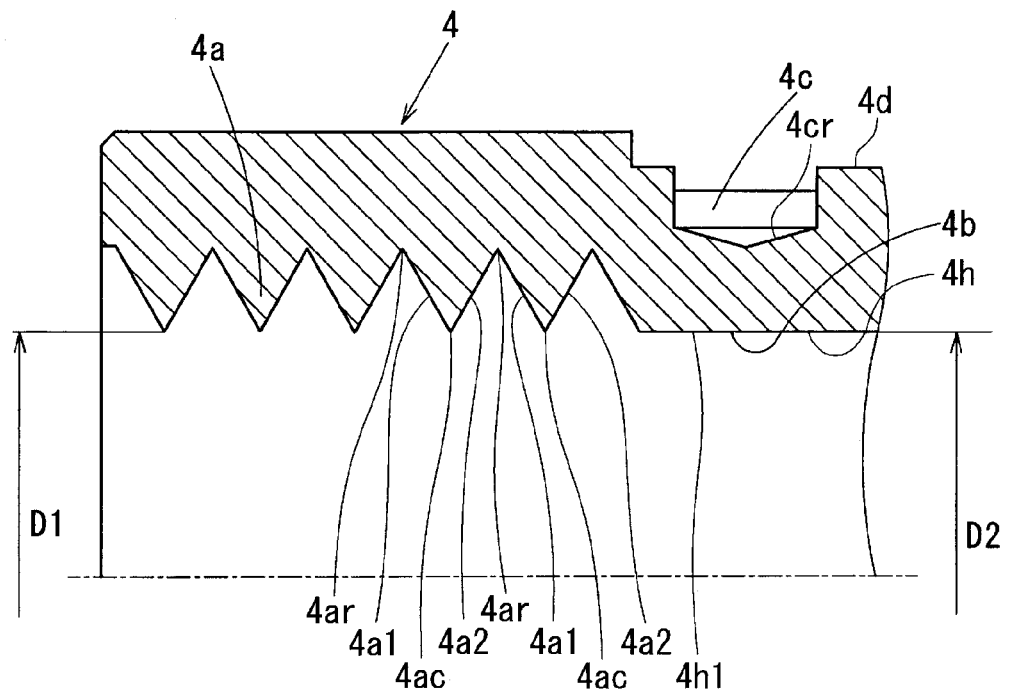
FIG. 3 is a half cross-sectional view of one end side of a sleeve of the first embodiment.

Furthermore, as shown in FIG. 3, an inner cylindrical surface (inner peripheral surface) 4b, is formed at a location, which is between the female-threaded portion 4a and the spring chamber 9 in the receiving hole 4h of the sleeve 4 in the axial direction. As shown in FIG. 3, an inner diameter D2 of the inner cylindrical surface 4b is equal to or slightly smaller than a minor diameter D1 of the female-threaded portion 4a, i.e., is equal to or slightly smaller than a diametrical distance between crests 4ac of the female-threaded portion 4a.

A plurality of blind holes 4c is radially recessed in an outer peripheral surface 4d of the one end side portion of the sleeve 4 within an axial extent of the inner cylindrical surface 4b. A radial wall thickness of the sleeve 4 is reduced between a radial bottom surface of each blind hole 4c and the inner cylindrical surface 4b in comparison to an adjacent part (e.g., an adjacent part located on the right side of the blind hole 4c in FIG. 3) of the sleeve 4, which is adjacent to the blind hole 4c. In the present embodiment, the number of the blind holes 4c is two, and these two blind holes 4c are formed at two locations of the outer peripheral surface 4d of the sleeve 4, which are diametrically opposed to each other, by a drill bit of a drill or the like.

The sleeve 4 has an input port 10, an output port 11, a feedback (F/B) port 12, a discharge port 13 and a drain port 14. The input port 10 receives hydraulic oil (hydraulic fluid), which is pumped from an oil pump (not shown) and is adjusted to a predetermined line pressure. The hydraulic oil, which is adjusted to a predetermined output pressure, is outputted through the output port 11 depending on the operational position of the spool 5. The output pressure is fed back to the F/B port 12. An excess amount of the hydraulic oil is discharged from the discharge port 13 to a low pressure side (e.g., an oil pan). The drain port 14 is communicated with the spring chamber 9 to implement breathing.

The spool 5 has an input land 5a, a discharge land 5b and a feedback (F/B) land 5c. The input land 5a changes a seal length of the input port 10. The discharge land 5b is placed on the one end side of the input land 5a in the axial direction and changes a seal length of the discharge port 13. The F/B land 5c is placed on the other end side of the input land 5a in the axial direction and seals an inner peripheral surface of the slide hole 8. The seal length of the input port 10 refers to an axial length of an axially overlapped area of the outer peripheral surface of the input land 5a relative to a portion of the inner peripheral surface of the sleeve 4, which is located between the input port 10 and the output port 11 in the axial direction. The seal length of the discharge port 13 refers to an axial length of an axially overlapped area of the outer peripheral surface of the discharge land 5b relative to a portion of the inner peripheral surface of the sleeve 4, which is located between the output port 11 and the discharge port 13 in the axial direction.

An outer diameter of the input land 5a is the same as an outer diameter of the discharge land 5b. An outer diameter of the F/B land 5c is slightly smaller than the outer diameter of the input land 5a and the outer diameter of the discharge land 5b.

A distribution chamber 15 is formed between the input land 5a and the discharge land 5b to distribute the hydraulic oil, which is supplied from the input port 10 depending on the operational position of the spool 5, to the output port 11 and the discharge port 13. Furthermore, a feedback (F/B) chamber 16 is formed between the input land 5a and the F/B land 5c and is communicated with the F/B port 12.

The output pressure, which is guided from the F/B port 12 to the F/B chamber 16, is exerted as a load (hereinafter referred to as a F/B load), which urges the spool 5 toward the one end side (the left end side in FIG. 2) of the slide hole 8 in response to a pressure difference between a pressure receiving surface area of the input land 5a and a pressure receiving surface area of the F/B land 5c. This pressure difference is caused by a difference between the outer diameter of the input land 5a and the outer diameter of the F/B land 5c.

A connecting shaft 5d, which is configured into a rod form, is integrally formed at the other end of the F/B land 5c of the spool 5. A distal end of the connecting shaft 5d contacts an end surface of the one end of the plunger 21. A diaphragm 17, which is made of a rubber material (elastic material), is installed to the connecting shaft 5d. The diaphragm 17 fluid-tightly partitions between the sleeve 4 side and the solenoid device 3 side.

One end of the spring 6 is engaged with the adjust screw 7, and the other end of the spring 6 is engaged with the discharge land 5b. The spring 6 is a compression coil spring, which is placed in the spring chamber 9 in a state where an initial load is applied to the spring 6, i.e., in a state where the spring 6 is compressed. The spring 6 urges the spool 5 toward the other end side in the axial direction.

Figure 4:
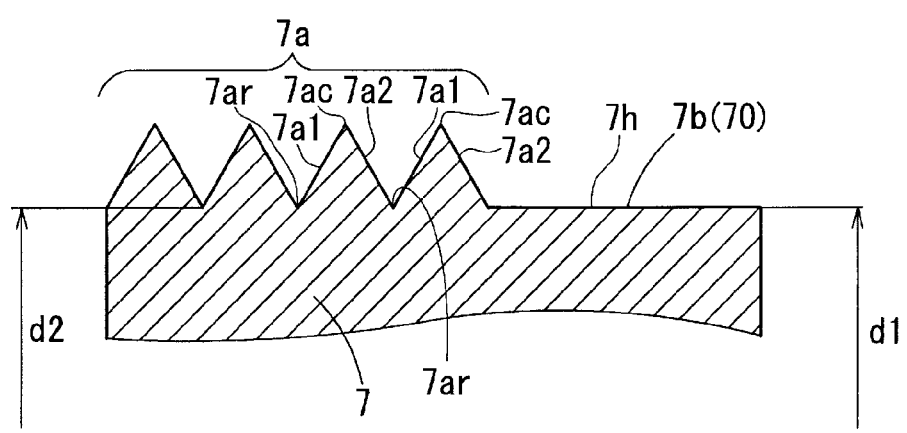
FIG. 4 is a half cross-sectional view of an adjust screw of the first embodiment.

The adjust screw 7 is made of a metal material (e.g., aluminum) and includes a male-threaded portion (or simply referred to as a male thread) 7a in an outer peripheral surface 7h of the adjust screw 7, as shown in FIG. 4. When the male-threaded portion 7a is threadably engaged with the female-threaded portion 4a, which is formed in the inner peripheral surface 4h1 of the sleeve 4, the adjust screw 7 is installed to an opening of the sleeve 4, which is formed in the one end of the sleeve 4. The adjust screw 7 is rotatable by a rotational force, which is applied from a jig (not shown) to the adjust screw 7, to adjust the amount of insertion of the adjust screw 7 relative to the sleeve 4 and thereby to adjust a set load of the spring 6.

Figure 5:
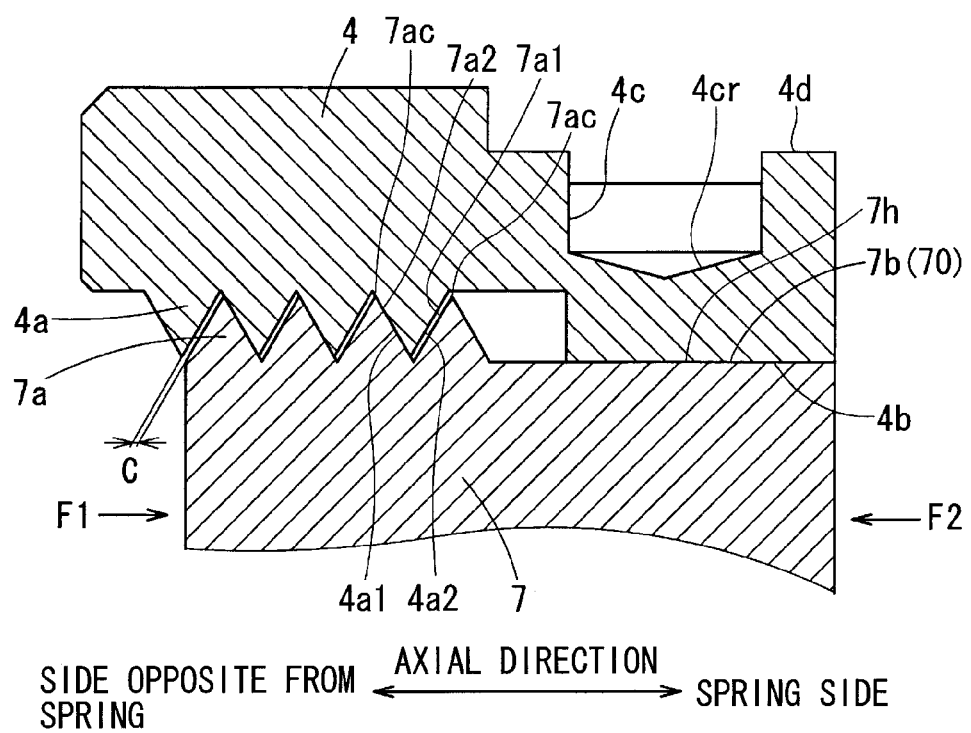
FIG. 5 is a half cross-sectional view of the sleeve and the adjust screw, showing a pressure adjustment position of the adjust screw according to the first embodiment.

As shown in FIGS. 4 and 5, the adjust screw 7 of the first embodiment has a predetermined portion 70, against which two wall sections 4cr of the sleeve 4 described below are plastically deformed and pressed by two punches, respectively, inserted into the blind holes 4c to limit (or prevent) rotation of the adjust screw 7. In the present embodiment, the predetermined portion 70 is formed as an outer cylindrical surface 7b in the outer peripheral surface 7h on the spring 6 side (the right side in FIG. 4) of the male-threaded portion 7a. An outer diameter d1 of the outer cylindrical surface 7b of the adjust screw 7 is slightly smaller than the minor diameter D1 of the female-threaded portion 4a of the sleeve 4 (see FIG. 3) to limit the interference with the female-threaded portion 4a at the time of threadably engaging the male-threaded portion 7a of the adjust screw 7 with the female-threaded portion 4a of the sleeve 4. For example, the outer diameter d1 of the outer cylindrical surface 7b may be the same as a minor diameter d2 of the male-threaded portion 7a, i.e., a diametrical distance between roots 7ar of the male-threaded portion 7a. Thereby, the outer cylindrical surface 7b of the adjust screw 7 is inserted on a radially inner side of the inner cylindrical surface 4b of the sleeve 4 while a slight gap is interposed between the outer cylindrical surface 7b and the inner cylindrical surface 4b.

As shown in FIG. 2, the solenoid device 3 includes a yoke 18, a coil 19, a stator 20 and the plunger 21. The yoke 18 forms a housing of the solenoid device 3. The coil 19 is placed on a radially inner side of the yoke 18. The stator 20 is configured into a cylindrical tubular form and forms a magnetic circuit around the coil 19 in cooperation with the yoke 18. The plunger 21 is placed on a radially inner side of the stator 20 and is configured to reciprocate in the axial direction. In the solenoid device 3, when the coil 19 is energized through terminals 23 held in a connector housing 22, the stator 20 is magnetized to generate a magnetic attractive force (drive force) to magnetically attract the plunger 21, i.e., to drive the plunger 21 toward the left side in FIG. 2. Thereby, the plunger 21 is moved on the radially inner side of the stator 20 toward the left side in FIG. 2. When the plunger 21 is moved toward the left side in FIG. 2, the spool 5 is moved in the slide hole 8 toward the one end side (the left end side in FIG. 2) against the urging force of the spring 6. At this time, the spool 5 is stationary held at a corresponding location, at which a reaction force of the spring 6 is balanced with a sum of the drive force of the solenoid device 3 and the F/B load. When the coil 19 is deenergized, the magnetic attractive force is lost. Therefore, the reaction force of the spring 6 overcomes the F/B load and thereby urges the spool 5 toward the other end side (the right side in FIG. 2) in the axial direction.

Next, the operation of the hydraulic pressure control valve 1 will be described.

The hydraulic oil, which is supplied from the oil pump to the input port 10, flows into the distribution chamber 15 through a gap formed between the outer cylindrical surface of the input land 5a and the inner cylindrical surface of the sleeve 4. Thereafter, the hydraulic oil is distributed to and outputted from the output port 11 and the discharge port 13. At this time, the output pressure of the hydraulic oil, which is outputted from the output port 11, varies depending on a ratio between the seal length of the input port 10 and the seal length of the discharge port 13 discussed above.

For example, in a state where the spool 5 is moved toward the one end side (the left end side in FIG. 2) in the inside of the sleeve 4 to increase the seal length of the input port 10 and to decrease the seal length of the discharge port 13, the amount of the hydraulic oil, which is supplied from the input port 10 to the distribution chamber 15, is decreased, while the amount of the hydraulic oil, which is outputted from the discharge port 13, is increased. Therefore, the amount of the hydraulic oil, which is outputted from the output port 11, is reduced to reduce the output pressure.

In contrast, in a state where the spool 5 is moved toward the other end side (the right end side in FIG. 2) in the inside of the sleeve 4 to decrease the seal length of the input port 10 and to increase the seal length of the discharge port 13, the amount of the hydraulic oil, which is supplied from the input port 10 to the distribution chamber 15, is increased, while the amount of the hydraulic oil, which is outputted from the discharge port 13, is decreased. Therefore, the amount of the hydraulic oil, which is outputted from the output port 11, is increased to increase the output pressure.

As discussed above, the ratio between the seal length of the input port 10 and the seal length of the discharge port 13 is changed depending on the operational position of the spool 5, so that the pressure (the output pressure) of the hydraulic oil, which is outputted from the output port 11, is changed.

Next, a step (hereinafter referred to as a pressure adjusting step) of adjusting the pressure, more specifically the set load of the spring 6 will be described in detail.

The set load of the spring 6 is adjusted by adjusting the amount of insertion of the adjust screw 7 relative to the sleeve 4. In the first embodiment, the axial load (serving as a first force) of the jig, which exerts the rotational force to the adjust screw 7, is indicated by F1, and the reaction force (serving as a second force) of the spring 6 is indicated by F2.

$$F1 > F2 \quad \text{Equation (1)}$$

In the present embodiment, the pressure adjusting step is executed in a state where the condition of the equation (1) is satisfied.

With reference to FIG. 3, the female-threaded portion (the female thread) 4a has a first flank 4a1 and a second flank 4a2. The first flank 4a1 is located on one end side (first side) of a crest 4ac of the female-threaded portion 4a, which is opposite from the spring 6 in the axial direction. The second flank 4a2 is located on the other end side (second side) of the crest 4ac of the female-threaded portion 4a, which is opposite from the one end side of the crest 4ac of the female-threaded portion 4a in the axial direction. With reference to FIG. 4, the male-threaded portion (the male thread) 7a has a first flank 7a1 and a second flank 7a2. The first flank 7a1 is located on one end side (first side) of a crest 7ac of the male-threaded portion 7a, which is opposite from the spring 6 in the axial direction. The second flank 7a2 is located on the other end side (second side) of the crest 7ac of the male-threaded portion 7a, which is opposite from the one end side of the crest 7ac of the male-threaded portion 7a in the axial direction.

At the pressure adjusting step of the first embodiment, at the time of tightening the adjust screw 7 with the jig, the condition of the equation (1) is satisfied. Therefore, as shown in FIG. 5, the adjust screw 7 is urged toward the other end side (the right end side in FIG. 5), and thereby the second flank 7a2 of the male-threaded portion 7a contacts the first flank 4a1 of the female-threaded portion 4a on the spring 6 side of the crest 7ac of the male-threaded portion 7a.

After the execution of the pressure adjusting step, in the state where the condition of the equation (1) is maintained, i.e., in the state where the axial load (=F1) is kept applied to the adjust screw 7 by the jig, the punches are inserted into the blind holes 4c, respectively, which are formed in the outer peripheral surface of the sleeve 4. Then, the wall sections 4cr of the sleeve 4 are plastically deformed and pressed by the punches in the radially inward direction against the outer cylindrical surface 7b of the adjust screw 7 to limit (or prevent) the rotation of the adjust screw 7. In this way, the installation position of the adjust screw 7 is fixed.

According to the first embodiment, the pressure adjusting step is executed in the state where the condition of F1>F2 is satisfied. Therefore, in this state, as shown in FIG. 5, the second flank 7a2 of the male-threaded portion 7a contacts the first flank 4a1 of the female-threaded portion 4a on the spring 6 side of the crest 7ac of the male-threaded portion 7a, and a pitch clearance C is formed between the first flank 7a1 of the male-threaded portion 7a and the second flank 4a2 of the female-threaded portion 4a on the opposite side of the crest 7ac of the male-threaded portion 7a, which is opposite from the spring 6 side in the axial direction.

After the execution of the pressure adjusting step, the wall sections 4cr of the sleeve 4 are plastically deformed in the radially inward direction and are pressed against the outer cylindrical surface 7b of the adjust screw 7 by the pressures of the punches. In other words, the outer cylindrical surface 7b of the adjust screw 7 is radially inwardly clamped by the wall sections 4cr of the sleeve 4. In this way, the deforming forces of the punches are not directly applied to the male-threaded portion 7a. That is, in the first embodiment, at the step of plastically deforming the wall sections 4cr of the sleeve 4, an axial force component of the plastically deforming force of the punches is not directly applied to the first and second flanks 7a1, 7a2 of the male-threaded portion 7a of the adjust screw 7 to displace the adjust screw 7 from the position, which is set in the pressure adjusting step. Therefore, a driving force for moving the adjust screw 7 toward the other side, which is opposite from the spring 6 side in the axial direction, is not generated at the time of plastically deforming the wall sections 4cr of the sleeve 4 against the outer cylindrical surface 7b of the adjust screw 7.

Furthermore, the step of plastically deforming the wall sections 4cr of the sleeve 4 is executed in the state where the condition of F1>F2 is maintained. Therefore, at the time of plastically deforming the wall sections 4cr of the sleeve 4 in the radially inward direction, the adjust screw 7 is not axially moved toward the opposite side, which is opposite from the spring 6 side in the axial direction. That is, the contact state of the second flank 7a2 of the male-threaded portion 7a with the first flank 4a1 of the female-threaded portion 4a on the spring 6 side of the crest 7ac of the male-threaded portion 7a is maintained. In this way, after the execution of the pressure adjusting step, an axial positional deviation of the adjust screw 7 relative to the sleeve 4 can be limited. Thereby, the set load of the spring 6 can be accurately adjusted and maintained to limit a pressure adjustment deviation.

Furthermore, in the state where the rotation of the adjust screw 7 relative to the sleeve 4 is limited (or prevented) after the plastic deformation of the wall sections 4cr of the sleeve 4, the second flank 7a2 of the male-threaded portion 7a tightly contacts the first flank 4a1 of the female-threaded portion 4a on the spring 6 side of the crest 7ac of the male-threaded portion 7a. Therefore, it is possible to effectively limit the leakage (leak quantity) of the hydraulic oil from the engaged area, at which the female-threaded portion 4a and the male-threaded portion 7a are threadably engaged with each other, toward the outside (the left side in FIG. 2) of the adjust screw 7.

Next, the second to sixth embodiments of the present disclosure will be described.

In the second to sixth embodiments, the components, which are the same as those of the first embodiment or have the same functions as those of the first embodiment, will be indicated by the same reference numerals and will not be described redundantly for the sake of simplicity.

Second Embodiment

In the second embodiment, the relationship of the axial loads applied to the adjust screw 7 at the pressure adjusting step is different from that of the first embodiment. Specifically, in the second embodiment, the pressure adjusting step is executed in a state where the condition of the following equation (2) is satisfied.

$$F1 < F2 \quad \text{Equation (2)}$$

Figure 6:
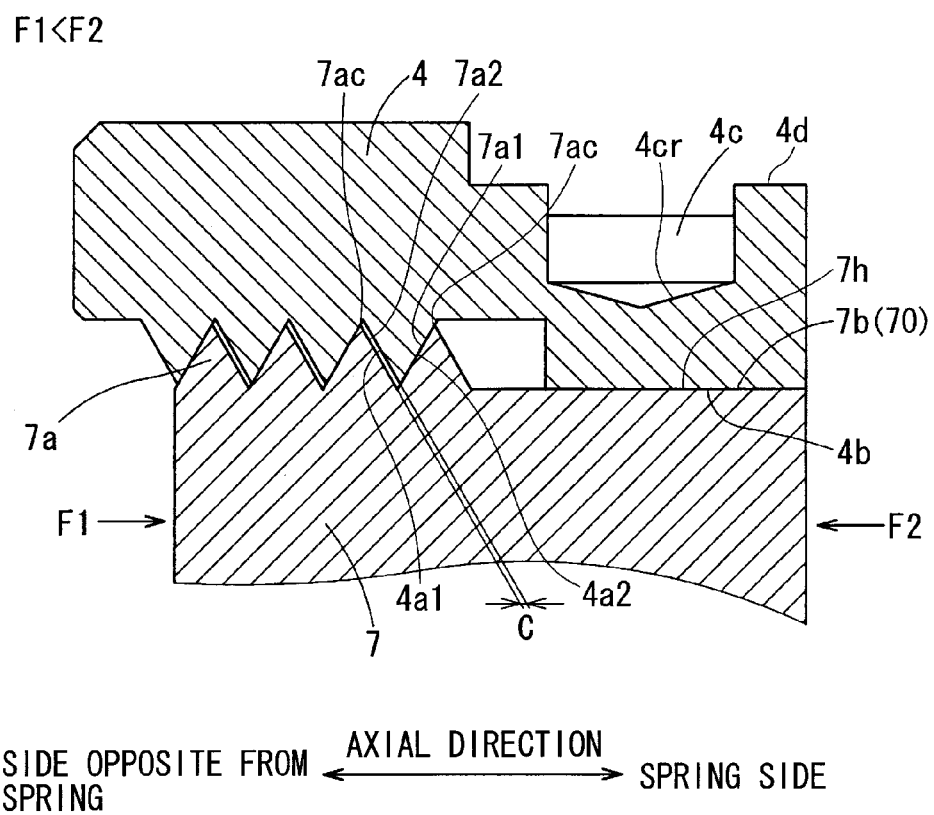
FIG. 6 is a half cross-sectional view of a sleeve and an adjust screw, showing a pressure adjustment position of the adjust screw according to a second embodiment of the present disclosure.

In the pressure adjusting step of the second embodiment, the condition of the equation (2) is satisfied at the time of tightening the adjust screw 7 into the sleeve 4. Therefore, as shown in FIG. 6, the first flank 7a1 of the male-threaded portion 7a contacts the second flank 4a2 of the female-threaded portion 4a on the opposite side of the crest 7ac of the male-threaded portion 7a, which is opposite from the spring 6 side in the axial direction. Thereby, the pitch clearance C is formed between the second flank 7a2 of the male-threaded portion 7a and the first flank 4a1 of the female-threaded portion 4a on the spring 6 side of the crest 7ac of the male-threaded portion 7a.

After the execution of the pressure adjusting step, in the state where the condition of the equation (2) is maintained, the punches (not shown) are inserted into the blind holes 4c, respectively, which are formed in the outer peripheral surface 4d of the sleeve 4. Then, the wall sections 4cr of the sleeve 4 are plastically deformed and pressed by the punches in the radially inward direction against the outer cylindrical surface 7b (the predetermined portion 70) of the adjust screw 7 to limit (or prevent) the rotation of the adjust screw 7. In this way, the installation position of the adjust screw 7 is fixed.

Even in the second embodiment, similar to the first embodiment, the plastically deforming force is not directly applied to the male-threaded portion 7a. Therefore, the axial movement of the adjust screw does not occur at the time of plastically deforming the wall sections 4cr of the sleeve 4 with the punches.

Furthermore, the step of plastically deforming the wall sections 4cr of the sleeve 4 is executed in the state where the condition of F1<F2 is maintained. Therefore, at the time of plastically deforming the wall sections 4cr of the sleeve 4 in the radially inward direction by the punches, the adjust screw 7 is not moved toward the spring 6 side in the axial direction against the reaction force of the spring 6. In this way, after the pressure adjusting step, an axial positional deviation of the adjust screw 7 relative to the sleeve 4 can be limited. Thereby, the set load of the spring 6 can be accurately adjusted and maintained to limit the pressure adjustment deviation.

Furthermore, in the state where the rotation of the adjust screw 7 relative to the sleeve 4 is limited after the plastic deformation of the wall sections 4cr of the sleeve 4, the first flank 7a1 of the male-threaded portion 7a tightly contacts the second flank 4a2 of the female-threaded portion 4a on the opposite side of the crest 7ac of the male-threaded portion 7a, which is opposite from the spring 6 side in the axial direction. Therefore, it is possible to limit the leakage of the hydraulic oil from the engaged area, at which the female-threaded portion 4a and the male-threaded portion 7a are threadably engaged with each other, toward the outside (the left side in FIG. 2) of the adjust screw 7.

Third Embodiment

Figure 7:
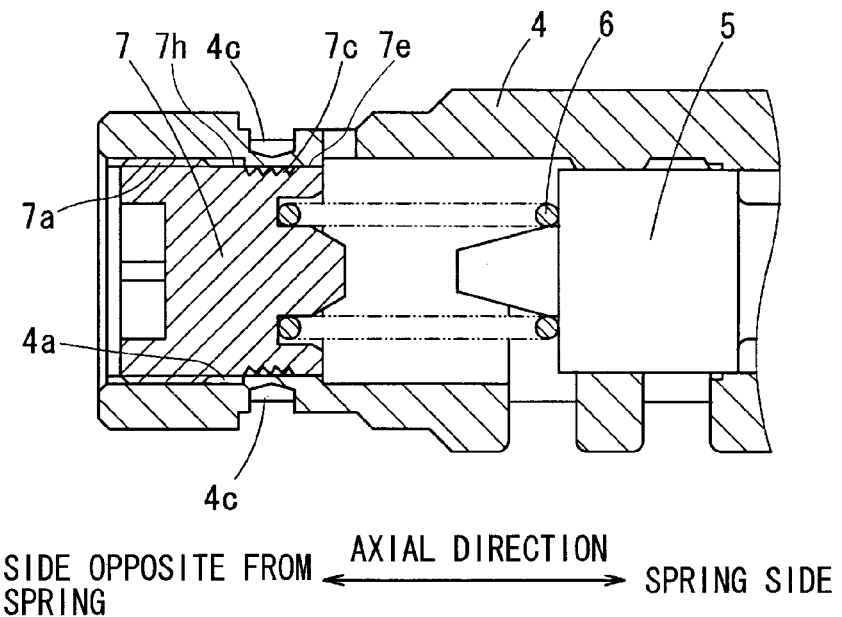
FIG. 7 is a partial cross-sectional view of a spool valve, which includes an adjust screw, according to a third embodiment of the present disclosure.

In the third embodiment, as shown in FIG. 7, the predetermined portion 70 of the adjust screw 7 is formed as a non-screw portion 7e, which is formed in the outer peripheral surface 7h of the adjust screw 7 on the spring 6 side of the male-threaded portion 7a in the axial direction. The non-screw portion 7e of the adjust screw 7 is axially inserted into the space located on the radially inner side of the inner cylindrical surface 4b of the sleeve 4 in a state where a small gap is formed between the non-screw portion 7e and the inner cylindrical surface 4b.

Figure 8:
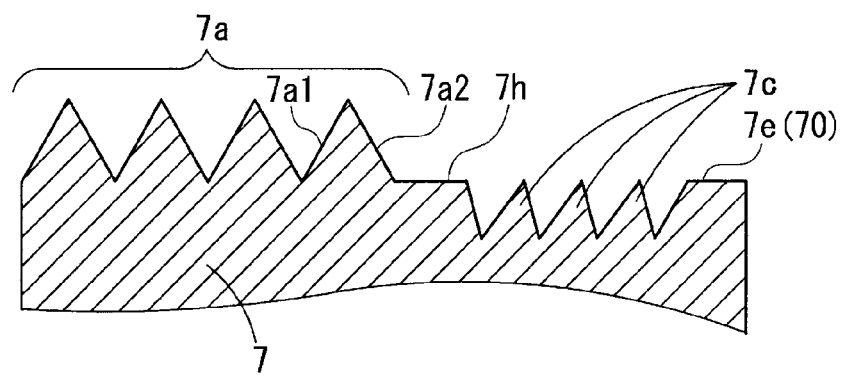
FIG. 8 is a half cross-sectional view of an adjust screw according to the third embodiment.

As shown in FIG. 8, a plurality (e.g., three in FIG. 8) of annular ridges 7c is formed in the outer peripheral surface of the non-screw portion 7e. Each of the ridges 7c is formed as a continuous annular ridge, which circumferentially continuously extends all around the adjust screw 7. An axial width of each ridge 7c, which is measured in the axial direction, progressively decreases in a radially outward direction toward an apex 7ca of the ridge 7c. Furthermore, an axial cross section of the ridge 7c forms an inverted V-shape that is asymmetrical about an imaginary perpendicular line 7cp, which is perpendicular to the axial direction and extends through a center of the apex 7ca of the axial cross section of the ridge 7c, as shown in FIG. 9.

Figure 9:
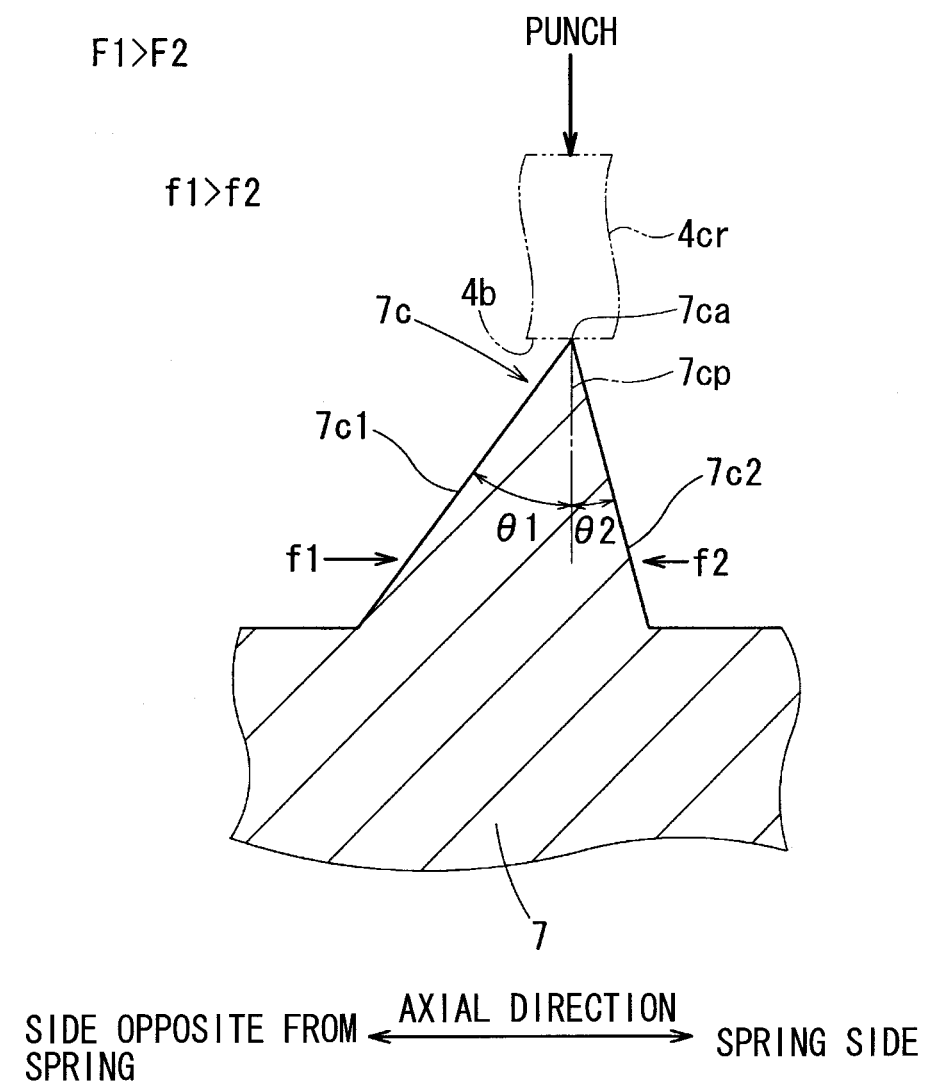
FIG. 9 is an enlarged partial cross-sectional view of a ridge of the adjust screw according to the third embodiment.

Specifically, with reference to FIG. 9, a side surface of the cross section of the ridge 7c, which is located on the opposite side of the apex 7ca of the ridge 7c that is opposite from the spring 6 side in the axial direction, is referred to as a first side surface 7c1. Another side surface of the cross section of the ridge 7c, which is located on the spring 6 side of the apex 7ca of the ridge 7c in the axial direction, is referred to as a second side surface 7c2. The first side surface 7c1 defines an angle θ1 relative to the perpendicular line 7cp, which is perpendicular to the axial direction and extends through the center of the apex 7ca of the ridge 7c. The second side surface 7c2 defines an angle θ2 relative to the perpendicular line 7cp. These angles θ1, θ2 satisfy the following equation (3).

$$\theta 1 > \theta 2 \qquad \text{Equation (3)}$$

One exemplary shape, which satisfies the condition of the equation (3), is a saw tooth shape (saw wave shape). Here, it should be noted that although the apex 7ca of the ridge 7c shown in FIG. 9 is configured into the sharp-edged triangular shape, the apex 7ca may be configured into any other suitable form, such as a round form (chamfered form), as long as the first side surface 7c1 and the second side surface 7c2 satisfy the relationship of θ1>θ2.

A height of the ridge 7c, which is measured in the direction perpendicular to the axial direction, is set to a value that does not cause the interference with the female-threaded portion 4a of the sleeve 4 at the time of threadably engaging the male-threaded portion 7a of the adjust screw 7 with the female-threaded portion 4a of the sleeve 4. Specifically, the outer diameter of the ridge 7c is set to be slightly smaller than the minor diameter D1 (see FIG. 3) of the female-threaded portion 4a. For instance, the outer diameter of the ridge 7c (the apex 7ca of the ridge 7c) may be the same as the minor diameter d2 (see FIG. 4) of the male-threaded portion 7a.

The pressure adjusting step of the third embodiment is executed in the state where the condition (F1>F2) of the equation (1) is satisfied. Therefore, the positional relationship between each of the first and second flanks 7a1, 7a2 of the male-threaded portion 7a and the corresponding one of the first and second flanks 4a1, 4a2 of the female-threaded portion 4a at the time of pressure adjustment is the same as that of the first embodiment (see FIG. 5). Specifically, the second flank 7a2 of the male-threaded portion 7a contacts the first flank 4a1 of the female-threaded portion 4a on the spring 6 side of the crest 7ac of the male-threaded portion 7a. Furthermore, the pitch clearance C is formed between the first flank 7a1 of the male-threaded portion 7a and the second flank 4a2 of the female-threaded portion 4a on the opposite side of the crest 7ac of the male-threaded portion 7a, which is opposite from the spring 6 side in the axial direction.

After the execution of the pressure adjusting step, in the state where the condition (F1>F2) of the equation (1) is maintained, i.e., in the state where the axial load (=F1) is kept applied to the adjust screw 7 by the jig, the punches (not shown) are inserted into the blind holes 4c (FIG. 7), respectively, which are formed in the outer peripheral surface 4d of the sleeve 4. Then, the wall sections 4cr of the sleeve 4 are plastically deformed and pressed by the punches in the radially inward direction against the ridge(s) 7c, i.e., one or more of the ridges 7c of the non-screw portion 7e to limit (or prevent) the rotation of the adjust screw 7. In this way, the installation position of the adjust screw 7 is fixed.

In the third embodiment, after the execution of the pressure adjusting step, the wall sections 4cr of the sleeve 4 are plastically deformed and pressed against the ridge(s) 7c of the non-screw portion 7e rather than the male-threaded portion 7a of the adjust screw 7. Therefore, the axial force component of the plastically deforming force is not directly applied to the first and second flanks 7a1, 7a2 of the male-threaded portion 7a to displace the adjust screw 7 from the position, which is set in the pressure adjusting step. In contrast, an axial force component of the plastically deforming force is applied to the ridge(s) 7c. Specifically, in the third embodiment, each ridge 7c is asymmetrical about the perpendicular line 7cp, which is perpendicular to the axial direction and extends through the center of the apex 7ca, and the condition of θ1>θ2 is satisfied. Therefore, an axial force component f1 of the plastically deforming force, which is applied to the first side surface 7c1 of the ridge 7c, is larger than an axial force component f2 of the plastically deforming force, which is applied to the second side surface 7c2 of the ridge 7c, as shown in FIG. 9. Thereby, a load of (f1−f2) is applied to the adjust screw 7 in the axial direction toward the spring 6 side to urge the adjust screw 7 toward the spring 6 side.

Furthermore, the step of plastically deforming the wall sections 4cr of the sleeve 4 is executed in the state where the condition of F1>F2 is maintained. Therefore, at the time of plastically deforming the wall sections 4cr of the sleeve 4 in the radially inward direction, the adjust screw 7 is not moved by the reaction force of the spring 6 toward the opposite side, which is opposite from the spring 6 side in the axial direction. In this way, after the pressure adjusting step, an axial positional deviation of the adjust screw 7 relative to the sleeve 4 can be limited. Thereby, the set load of the spring 6 can be accurately adjusted and maintained to limit the pressure adjustment deviation.

Furthermore, in the third embodiment, the step of plastically deforming the wall sections 4cr of the sleeve 4 is executed in the state where the condition of F1>F2 is maintained. Furthermore, at the step of plastically deforming the wall sections 4cr of the sleeve 4, the axial force component of the plastically deforming force, which is applied to the ridge 7c, acts as the urging force, which urges the adjust screw 7 toward the spring 6 side in the axial direction. Therefore, the urging force, which urges the second flank 7a2 of the male-threaded portion 7a against the first flank 4a1 of the female-threaded portion 4a on the spring 6 side of the crest 7ac of the male-threaded portion 7a, is increased. Therefore, it is possible to further effectively limit the leakage of the hydraulic oil from the engaged area, at which the female-threaded portion 4a and the male-threaded portion 7a are threadably engaged with each other.

Fourth Embodiment

Figure 10:
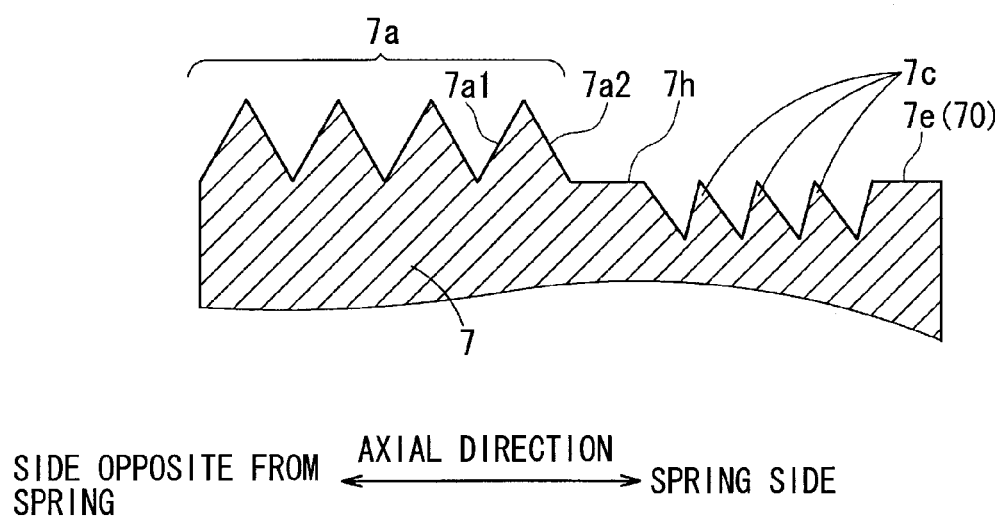
FIG. 10 is a half cross-sectional view of an adjust screw according to a fourth embodiment of the present disclosure.

Similar to the third embodiment, in a fourth embodiment of the present disclosure, the non-screw portion 7e (the predetermined portion 70) is formed in the outer peripheral surface 7h of the adjust screw 7, and the ridges 7c are formed in the outer peripheral surface of the non-screw portion 7e, as shown in FIG. 10.

Figure 11:
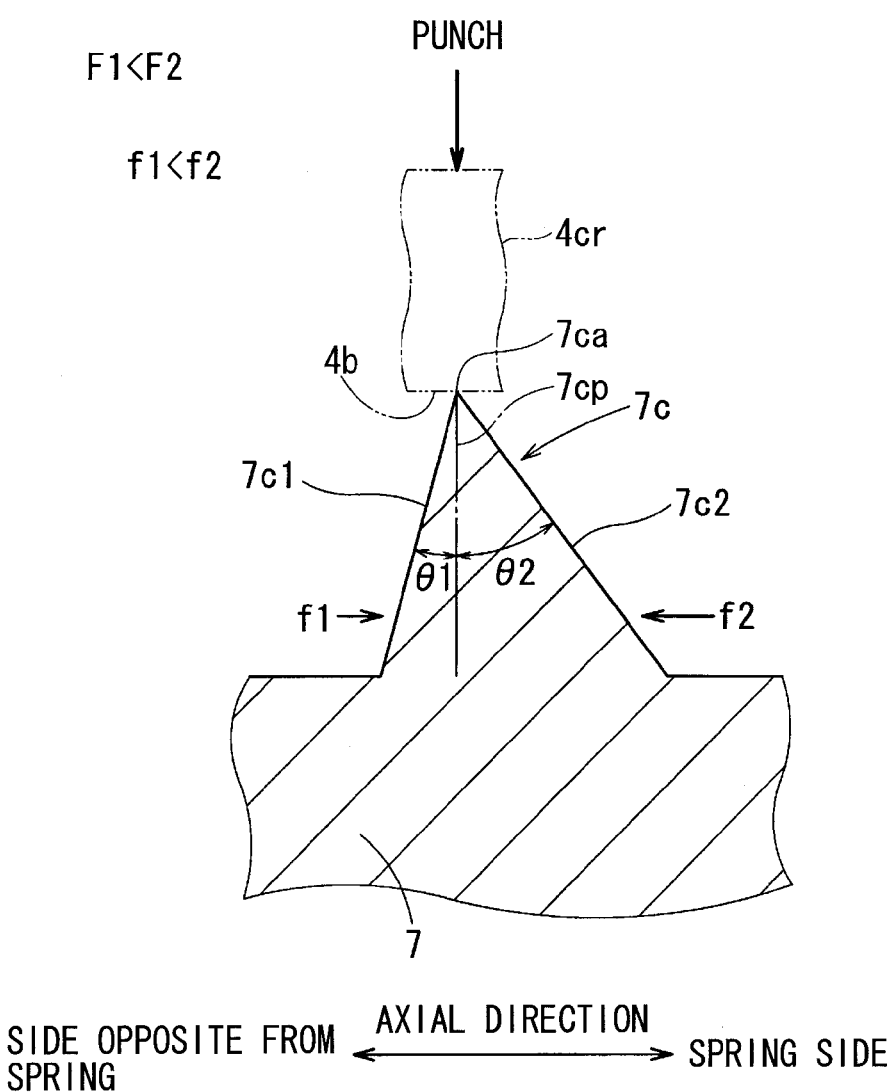
FIG. 11 is an enlarged partial cross-sectional view of a ridge of the adjust screw according to the fourth embodiment.

As shown in FIG. 11, each ridge 7c is configured to satisfy the condition of the following equation (4) with respect to the relationship between the angle θ1 and the angle θ2.

$$\theta 1 < \theta 2 \quad \text{Equation (4)}$$

The pressure adjusting step of the fourth embodiment is executed in the state where the condition (F1<F2) of the equation (2) is satisfied. Therefore, the positional relationship between each of the first and second flanks 7a1, 7a2 of the male-threaded portion 7a and the corresponding one of the first and second flanks 4a1, 4a2 of the female-threaded portion 4a at the time of pressure adjustment is the same as that of the second embodiment (see FIG. 6). Specifically, the first flank 7a1 of the male-threaded portion 7a contacts the second flank 4a2 of the female-threaded portion 4a on the opposite side of the crest 7ac of the male-threaded portion 7a, which is opposite from the spring 6 side in the axial direction. Furthermore, the pitch clearance C is formed between the second flank 7a2 of the male-threaded portion 7a and the first flank 4a1 of the female-threaded portion 4a on the spring 6 side of the crest 7ac of the male-threaded portion 7a.

After the execution of the pressure adjusting step, in the state where the relationship of F1<F2 is maintained, the punches (not shown) are inserted into the blind holes 4c, respectively, which are formed in the outer peripheral surface 4d of the sleeve 4. Then, the wall sections 4cr of the sleeve 4 are plastically deformed and pressed by the punches in the radially inward direction against the ridge(s) 7c, i.e., one or more of the ridges 7c of the non-screw portion 7e to limit (or prevent) the rotation of the adjust screw 7. In this way, the installation position of the adjust screw 7 is fixed.

In the fourth embodiment, at the time of plastically deforming the wall sections 4cr of the sleeve 4 against the ridge(s) 7c in the radially inward direction, the relationship of the equation (4) is satisfied with respect to the relationship between the angle θ1 and the angle θ2. Therefore, the axial force component f2 of the plastically deforming force, which is applied to the second side surface 7c2 of the ridge 7c, is larger than the axial force component f1 of the plastically deforming force, which is applied to the first side surface 7c1 of the ridge 7c. Thereby, a load of (f2−f1) is applied to the adjust screw 7 in the axial direction away from the spring 6 side toward the opposite side, which is opposite from the spring 6 side in the axial direction, to urge the adjust screw toward the opposite side.

Furthermore, the step of plastically deforming the wall sections 4cr of the sleeve 4 is executed in the state where the condition of F1<F2 is maintained. Therefore, at the time of plastically deforming the wall sections 4cr of the sleeve 4 in the radially inward direction, the adjust screw 7 is not moved against the reaction force of the spring 6 toward the spring 6 side in the axial direction. In this way, after the pressure adjusting step, an axial positional deviation of the adjust screw 7 relative to the sleeve 4 can be limited. Thereby, the set load of the spring 6 can be accurately adjusted and maintained to limit the pressure adjustment deviation.

Furthermore, in the fourth embodiment, the step of plastically deforming the wall sections 4cr of the sleeve 4 is executed in the state where the condition of F1<F2 is maintained. Furthermore, at the step of plastically deforming the wall sections 4cr of the sleeve 4, the axial force component of the plastically deforming force, which is applied to the ridge 7c, acts as the urging force, which urges the adjust screw 7 in the axial direction away from the spring 6 side toward the opposite side. Therefore, the urging force, which urges the first flank 7a1 of the male-threaded portion 7a against the second flank 4a2 of the female-threaded portion 4a on the opposite side of the crest 7ac of the male-threaded portion 7a, is increased. Therefore, it is possible to further effectively limit the leakage of the hydraulic oil from the engaged area, at which the female-threaded portion 4a and the male-threaded portion 7a are threadably engaged with each other.

Fifth Embodiment

In a fifth embodiment of the present disclosure, the predetermined portion 70 of the adjust screw 7 is formed as a tapered surface (e.g., a conical surface) 7d, which is tapered in the axial direction. The tapered surface 7d is formed in the outer peripheral surface 7h of the adjust screw 7 at a location, which is on the spring 6 side of the male-threaded portion 7a in the axial direction.

Figure 12:
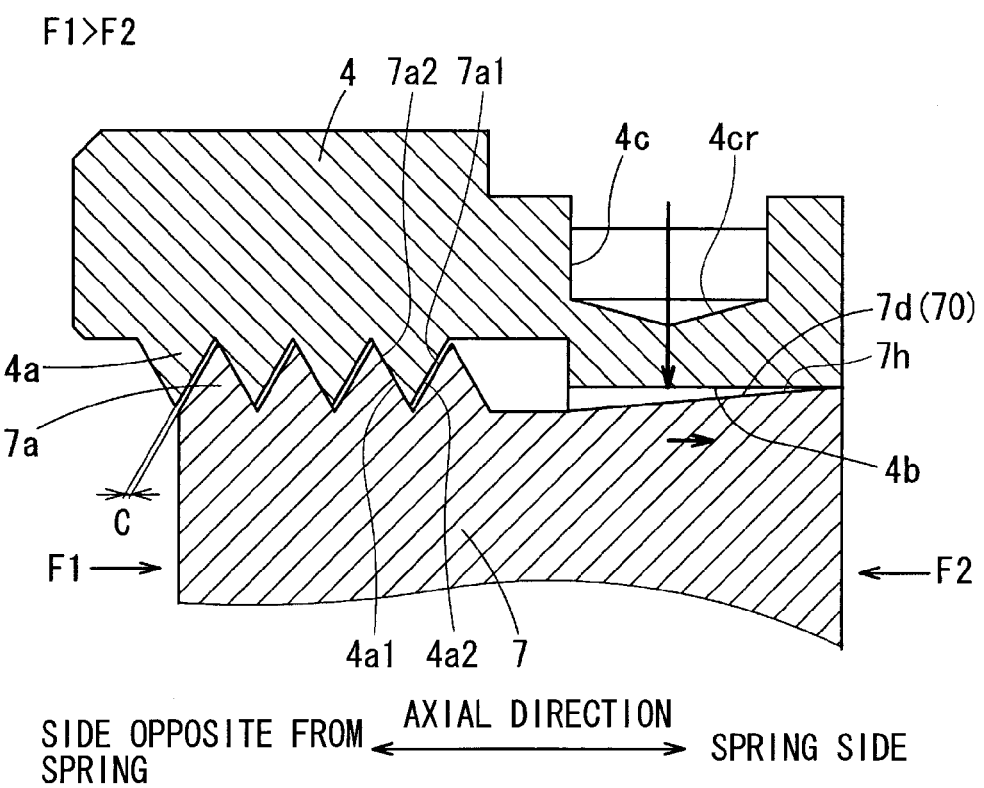
FIG. 12 is a half cross-sectional view of a sleeve and an adjust screw according to a fifth embodiment of the present disclosure.

As shown in FIG. 12, the tapered surface 7d is configured such that an outer diameter of the tapered surface 7d progressively increases from the opposite side toward the spring 6 side in the axial direction. In order to limit the interference between the tapered surface 7d and the female-threaded portion 4a of the sleeve 4, the maximum outer diameter of the tapered surface 7d is set to be slightly smaller than the minor diameter D1 of the female-threaded portion 4a.

The pressure adjusting step of the fifth embodiment is executed in the state where the condition (F1>F2) of the equation (1) discussed in the first embodiment is satisfied. Therefore, the positional relationship between each of the first and second flanks 7a1, 7a2 of the male-threaded portion 7a and the corresponding one of the first and second flanks 4a1, 4a2 of the female-threaded portion 4a at the time of pressure adjustment is the same as that of the first embodiment (see FIG. 5). Specifically, the second flank 7a2 of the male-threaded portion 7a contacts the first flank 4a1 of the female-threaded portion 4a on the spring 6 side of the crest 7ac of the male-threaded portion 7a. Furthermore, the pitch clearance C is formed between the first flank 7a1 of the male-threaded portion 7a and the second flank 4a2 of the female-threaded portion 4a on the opposite side of the crest 7ac of the male-threaded portion 7a, which is opposite from the spring 6 side in the axial direction.

After the execution of the pressure adjusting step, in the state where the condition (F1>F2) of the equation (1) is maintained, i.e., in the state where the axial load (=F1) is kept applied to the adjust screw 7 by the jig, the punches (not shown) are inserted into the blind holes 4c, respectively, which are formed in the outer peripheral surface 4d of the sleeve 4. Then, the wall sections 4cr of the sleeve 4 are plastically deformed and pressed by the punches in the radially inward direction against the tapered surface 7d of the adjust screw 7 to limit (or prevent) the rotation of the adjust screw 7. In this way, the installation position of the adjust screw 7 is fixed.

In the fifth embodiment, after the execution of the pressure adjusting step, the wall sections 4cr of the sleeve 4 are plastically deformed against the tapered surface 7d rather than the male-threaded portion 7a of the adjust screw 7. Therefore, the axial force component of the plastically deforming force is not directly applied to the first and second flanks 7a1, 7a2 of the male-threaded portion 7a to displace the adjust screw 7 from the position, which is set in the pressure adjusting step. In contrast, an axial force component of the plastically deforming force is applied to the tapered surface 7d. Since the outer diameter of the tapered surface 7d progressively increases from the opposite side to the spring 6 side in the axial direction, the axial force component of the plastically deforming force is exerted against the tapered surface 7d to urge the adjust screw 7 in the axial direction toward the spring 6 side. Furthermore, the step of plastically deforming the wall sections 4cr of the sleeve 4 is executed in the state where the condition of F1>F2 is maintained. Therefore, at the time of plastically deforming the wall sections 4cr of the sleeve 4 in the radially inward direction, the adjust screw 7 is not moved by the reaction force of the spring 6 toward the opposite side, which is opposite from the spring 6 side in the axial direction.

In this way, after the pressure adjusting step, an axial positional deviation of the adjust screw 7 relative to the sleeve 4 can be limited. Thereby, the set load of the spring 6 can be accurately adjusted and maintained to limit the pressure adjustment deviation. Furthermore, in the fifth embodiment, the step of plastically deforming the wall sections 4cr of the sleeve 4 is executed in the state where the condition of F1>F2 is maintained. Furthermore, at the step of plastically deforming the wall sections 4cr of the sleeve 4, the axial force component of the plastically deforming force, which is applied to the tapered surface 7d, acts as the urging force, which urges the adjust screw 7 toward to the spring 6 side in the axial direction. Therefore, the urging force, which urges the second flank 7a2 of the male-threaded portion 7a against the first flank 4a1 of the female-threaded portion 4a on the spring 6 side of the crest 7ac of the male-threaded portion 7a, is increased. Therefore, it is possible to further effectively limit the leakage of the hydraulic oil from the engaged area, at which the female-threaded portion 4a and the male-threaded portion 7a are threadably engaged with each other.

Sixth Embodiment

Similar to the fifth embodiment, in a sixth embodiment of the present disclosure, the tapered surface 7d (the predetermined portion 70), which is tapered in the axial direction, is formed in the outer peripheral surface 7h of the adjust screw 7 at the location, which is on the spring 6 side of the male-threaded portion 7a in the axial direction.

Figure 13:
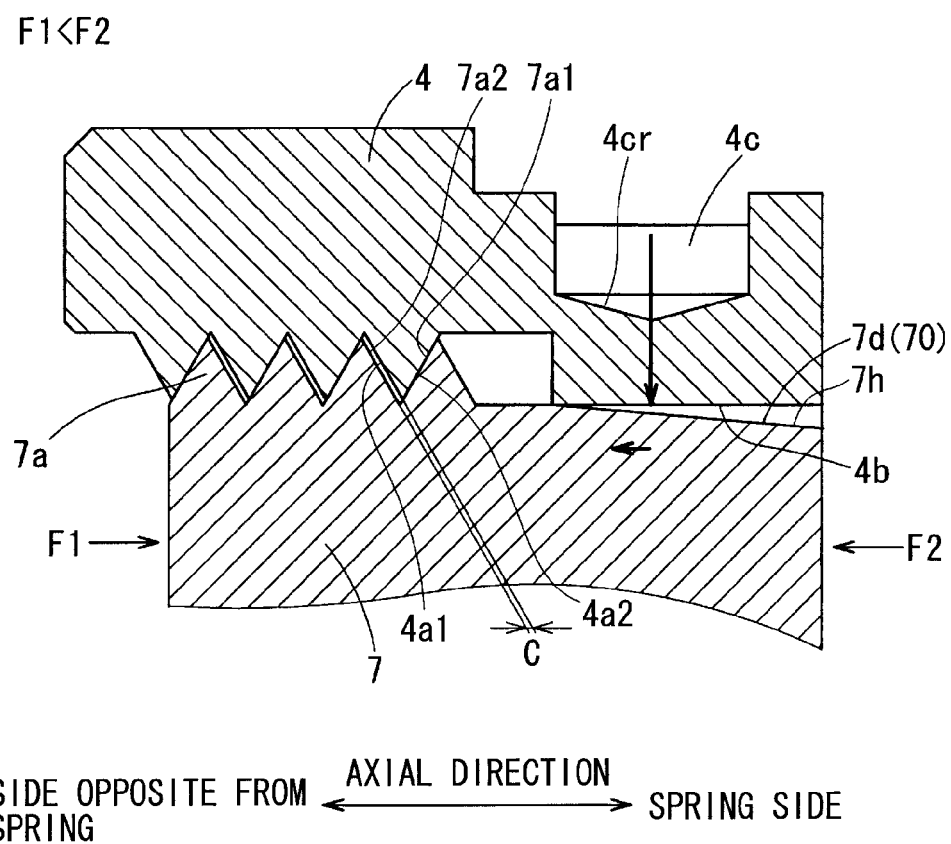
FIG. 13 is a half cross-sectional view of a sleeve and an adjust screw according to a sixth embodiment of the present disclosure.

As shown in FIG. 13, the tapered surface 7d is configured such that the outer diameter of the tapered surface 7d progressively decreases from the opposite side toward the spring 6 side in the axial direction. In order to limit the interference between the tapered surface 7d and the female-threaded portion 4a of the sleeve 4, the maximum outer diameter of the tapered surface 7d is set to be slightly smaller than the minor diameter D1 of the female-threaded portion 4a.

The pressure adjusting step of the sixth embodiment is executed in the state where the condition (F1<F2) of the equation (2) discussed in the second embodiment is satisfied. Therefore, the positional relationship between each of the first and second flanks 7a1, 7a2 of the male-threaded portion 7a and the corresponding one of the first and second flanks 4a1, 4a2 of the female-threaded portion 4a at the time of pressure adjustment is the same as that of the second embodiment (see FIG. 6). Specifically, the first flank 7a1 of the male-threaded portion 7a contacts the second flank 4a2 of the female-threaded portion 4a on the opposite side of the crest 7ac of the male-threaded portion 7a, which is opposite from the spring 6 side in the axial direction. Furthermore, the pitch clearance C is formed between the second flank 7a2 of the male-threaded portion 7a and the first flank 4a1 of the female-threaded portion 4a on the spring 6 side of the crest 7ac of the male-threaded portion 7a.

After the execution of the pressure adjusting step, in the state where the condition (F1<F2) of the equation (2) is maintained, the punches (not shown) are inserted into the blind holes 4c, respectively, which are formed in the outer peripheral surface 4*d* of the sleeve 4. Then, the wall sections 4*cr* of the sleeve 4 are plastically deformed and pressed by the punches in the radially inward direction against the tapered surface 7*d* of the adjust screw 7 to limit (or prevent) the rotation of the adjust screw 7. In this way, the installation position of the adjust screw 7 is fixed.

In the sixth embodiment, after the execution of the pressure adjusting step, the wall sections 4*cr* of the sleeve 4 are plastically deformed against the tapered surface 7*d* rather than the male-threaded portion 7*a* of the adjust screw 7. Therefore, the axial force component of the plastically deforming force is not directly applied to the first and second flanks 7*a*1, 7*a*2 of the male-threaded portion 7*a* to displace the adjust screw 7 from the position, which is set in the pressure adjusting step. In contrast, an axial force component of the plastically deforming force is applied to the tapered surface 7*d*. Since the outer diameter of the tapered surface 7*d* progressively decreases from the opposite side to the spring 6 side in the axial direction, the axial force component of the plastically deforming force is exerted against the tapered surface 7*d* to urge the adjust screw 7 in the axial direction away from the spring 6 side toward the opposite side. Furthermore, the step of plastically deforming the wall sections 4*cr* of the sleeve 4 is executed in the state where the condition of F1<F2 is maintained. Therefore, at the time of plastically deforming the wall sections 4*cr* of the sleeve 4 in the radially inward direction, the adjust screw 7 is not moved against the reaction force of the spring 6 toward the spring 6 side in the axial direction.

In this way, after the pressure adjusting step, an axial positional deviation of the adjust screw 7 relative to the sleeve 4 can be limited. Thereby, the set load of the spring 6 can be accurately adjusted and maintained to limit the pressure adjustment deviation. Furthermore, in the sixth embodiment, the step of plastically deforming the wall sections 4*cr* of the sleeve 4 is executed in the state where the condition of F1<F2 is maintained. Furthermore, at the step of plastically deforming the wall sections 4*cr* of the sleeve 4, the axial force component of the plastically deforming force, which is applied to the tapered surface 7*d*, acts as the urging force, which urges the adjust screw 7 in the axial direction away from the spring 6 toward the opposite side. Therefore, the urging force, which urges the first flank 7*a*1 of the male-threaded portion 7*a* against the second flank 4*a*2 of the female-threaded portion 4*a* on the opposite side of the crest 7*ac* of the male-threaded portion 7*a*, is increased. Therefore, it is possible to further effectively limit the leakage of the hydraulic oil from the engaged area, at which the female-threaded portion 4*a* and the male-threaded portion 7*a* are threadably engaged with each other.

Now, modifications of the above embodiments will be described.

In the first and second embodiments, the outer cylindrical surface 7*b* of the adjust screw 7 is placed on the spring 6 side of the male-threaded portion 7*a* in the axial direction. Alternatively, the outer cylindrical surface 7*b* of the adjust screw 7 may be placed on the opposite side of the male-threaded portion 7*a*, which is opposite from the spring 6 side in the axial direction. Further alternatively, the outer cylindrical surface 7*b* of the adjust screw 7 may be placed in the axial center part of the male-threaded portion 7*a*, so that the outer cylindrical surface 7*b* is axially interposed between a male-threaded segment and a male-threaded segment in the male-threaded portion.

Similarly, the ridges 7*c* of the third and fourth embodiments or the tapered surface 7*d* of the fifth and sixth embodiments may be placed on the opposite side of the male-threaded portion 7*a*, which is opposite from the spring 6 side in the axial direction, or may be placed in the axial center part of the male-threaded portion 7*a*.

Figure 14:
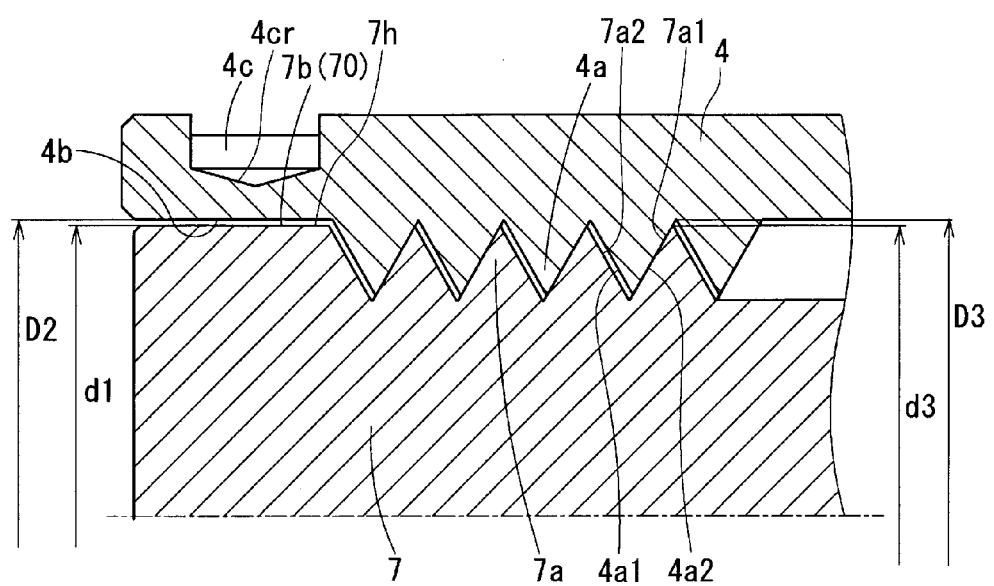
FIG. 14 is a half cross-sectional view of one end side of a spool valve in a modification of the first or second embodiment.
Figure 15:
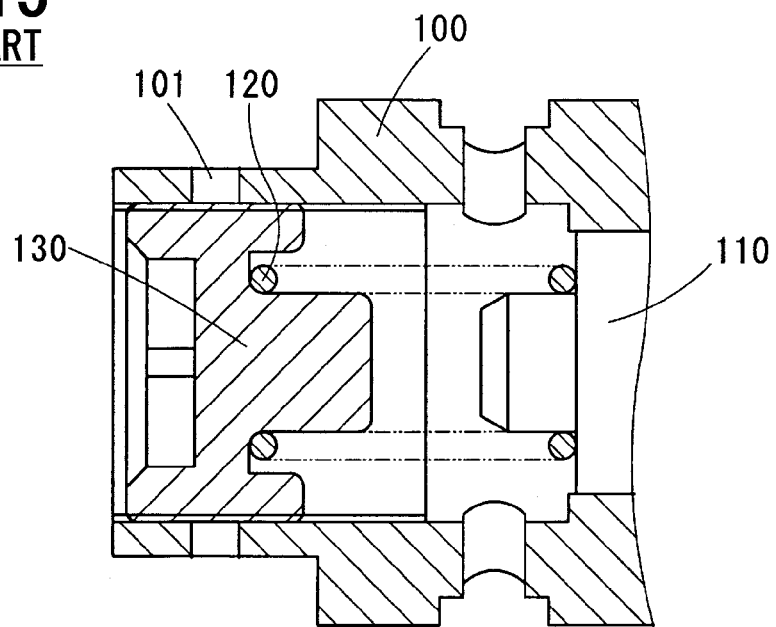
FIG. 15 is a partial cross-sectional view of a solenoid valve in a first prior art.
Figure 16:
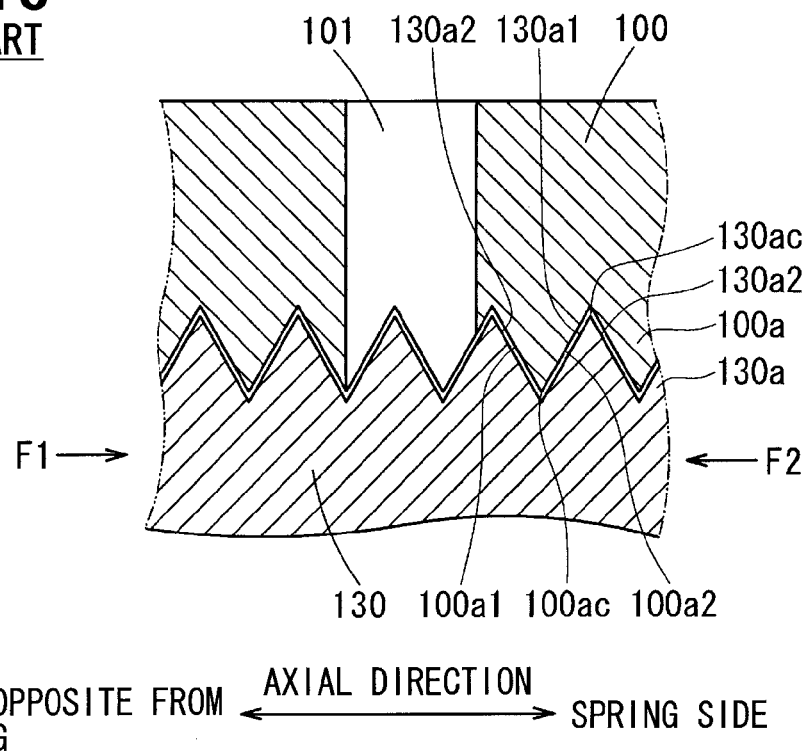
FIG. 16 is a partial enlarged cross-sectional view of the solenoid valve in the first prior art, showing axial loads applied to an adjust screw at the time of pressure adjustment.
Figure 17A:
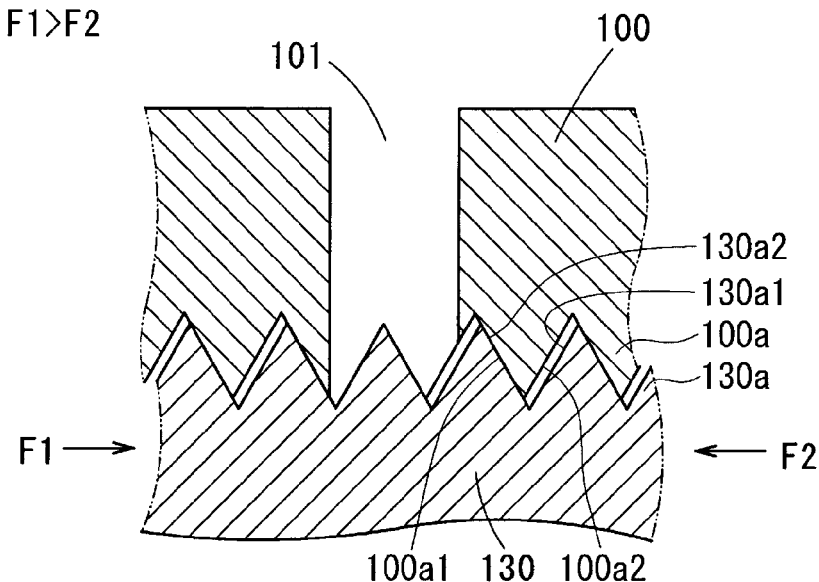
FIG. 17A is a partial enlarged cross-sectional view of the solenoid valve in the first prior art, showing a pressure adjustment position of the adjust screw.
Figure 17B:
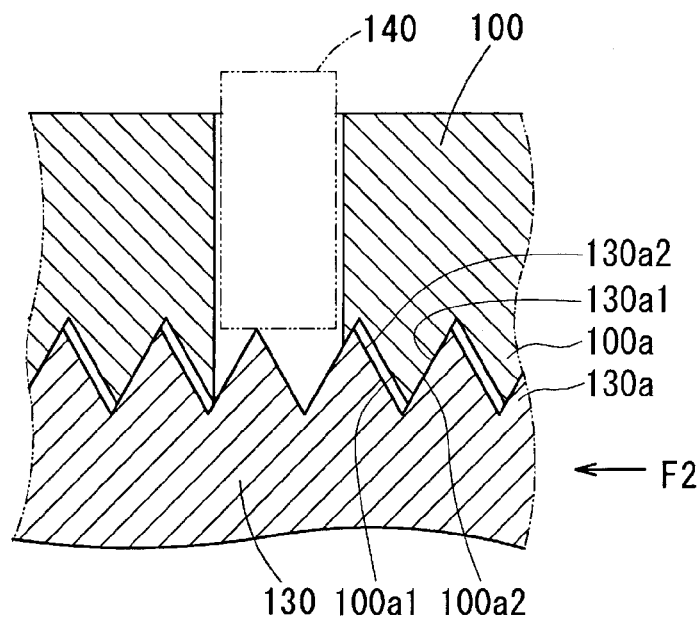
FIG. 17B is a partial enlarged cross-sectional view of the solenoid valve in the first prior art, showing a step of plastically deforming a crest of a male-threaded portion of the adjust screw.
Figure 18:
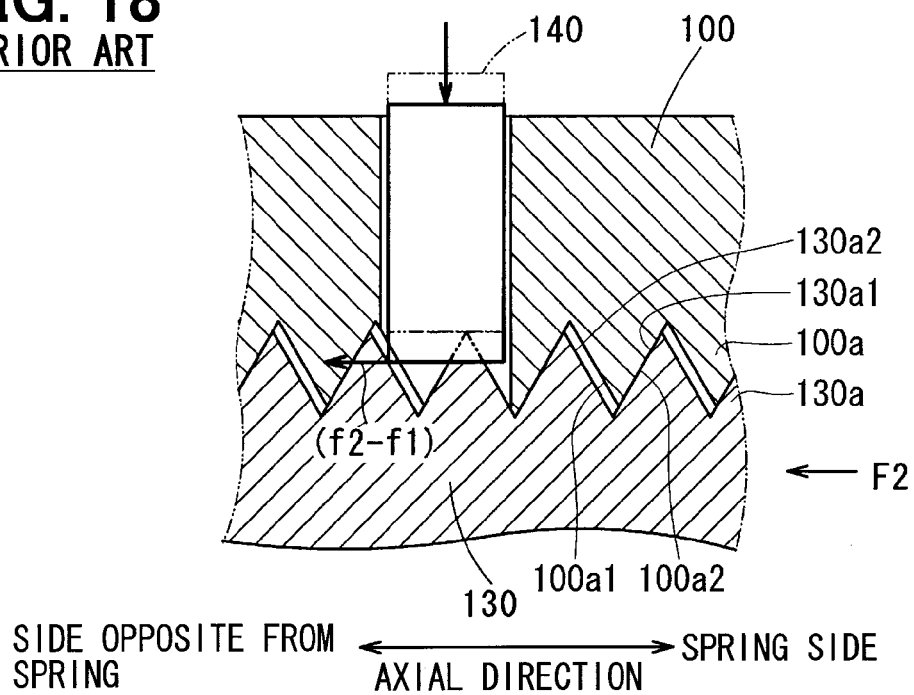
FIG. 18 is a partial enlarged cross-sectional view of the solenoid valve in the first prior art, showing one state at the time of plastically deforming the crest of the male-threaded portion of the adjust screw.
Figure 19:
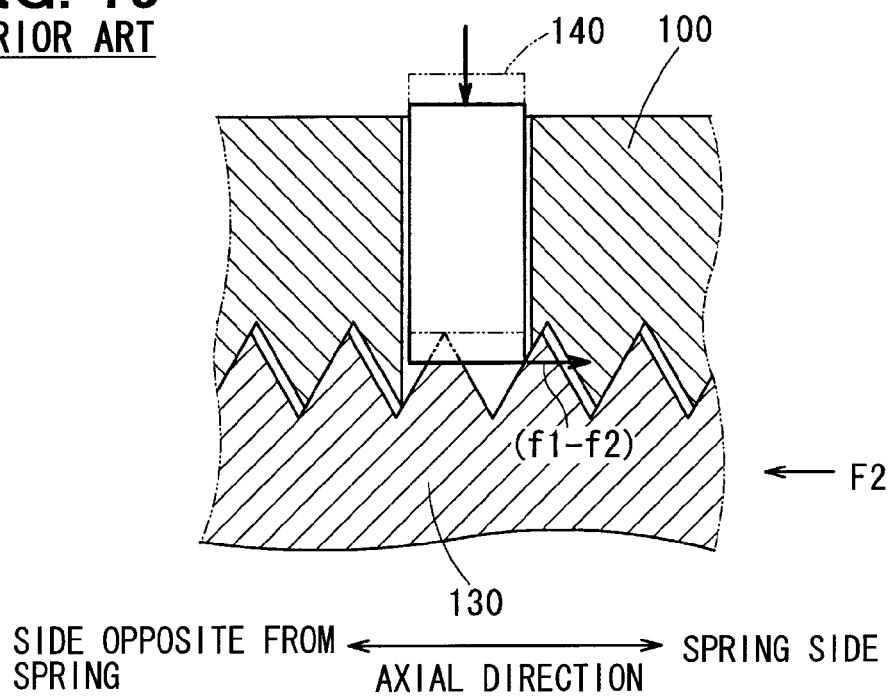
FIG. 19 is a partial enlarged cross-sectional view of the solenoid valve in the first prior art, showing another state at the time of plastically deforming the crest of the male-threaded portion of the adjust screw.
Figure 20:
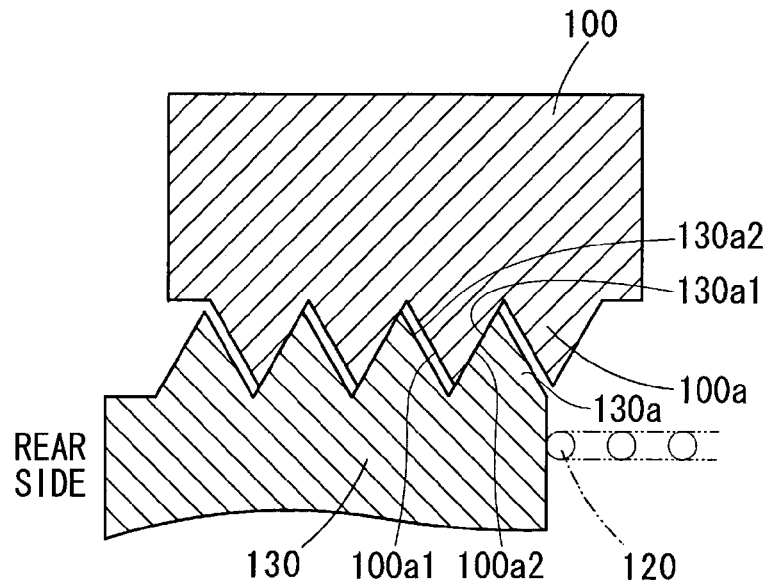
FIG. 20 is a partial enlarged cross-sectional view of a solenoid valve in a second prior art, showing a state where an adjust screw is moved toward a side opposite from a spring side by a reaction of a spring.
Figure 21:
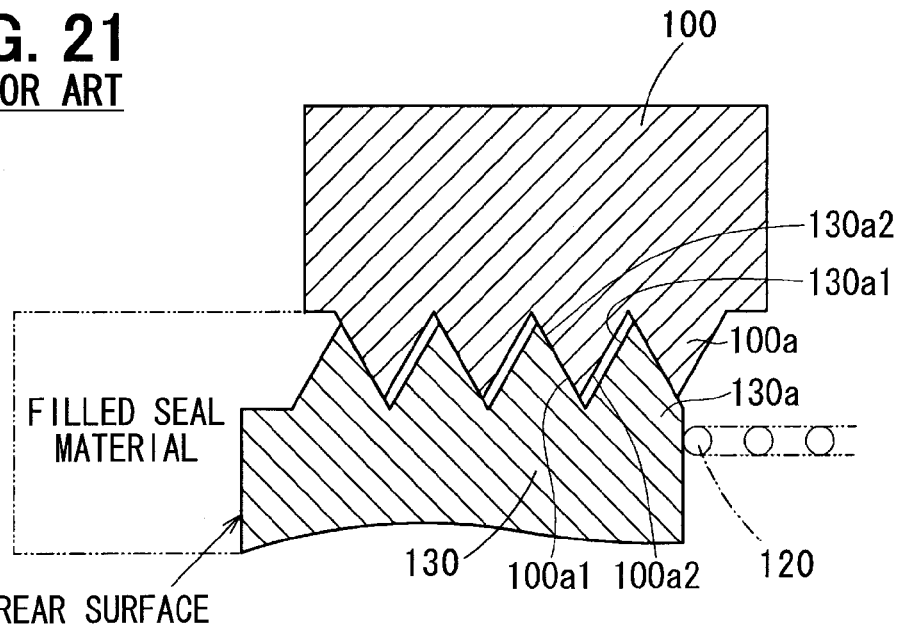
FIG. 21 is a partial enlarged cross-sectional view of a solenoid valve in the second prior art, showing a state where the adjust screw is moved toward the spring side by a filling pressure of a seal material.

In the case where the outer cylindrical surface 7*b* (or the ridges 7*c* or the tapered surface 7*d*) is placed on the opposite side of the male-threaded portion 7*a*, which is opposite from the spring 6 side in the axial direction, the inner cylindrical surface 4*b* of the sleeve 4 discussed in the first embodiment is formed on the opposite side of the female-threaded portion 4*a*, which is opposite from the spring 6 side in the axial direction. Therefore, the inner diameter D2 of the inner cylindrical surface 4*b* may be set to be the same as or larger than a major diameter D3 of the female-threaded portion 4*a*, i.e., a diametrical distance between roots 4*ar* of the female-threaded portion 4*a*, as shown in FIG. 14. In other words, the inner diameter D2 of the inner cylindrical surface 4*b* will never be made smaller than the major diameter D3 of the female-threaded portion 4*a*. In such a case, when the outer diameter d1 of the outer cylindrical surface 7*b* is made slightly smaller than the minor diameter D1 of the female-threaded portion 4*a* (see FIG. 3) like in the first embodiment, a gap, which corresponds to the height of the crest 4*ac* of the female-threaded portion 4*a*, is formed between the inner cylindrical surface 4*b* and the outer cylindrical surface 7*b*. Therefore, in such a case, the wall sections 4*cr* of the sleeve 4 cannot be plastically deformed against the outer cylindrical surface 7*b* with the punches to fasten the adjust screw 7. Therefore, in the case where the outer cylindrical surface 7*b* is placed on the opposite side of the male-threaded portion 7*a*, which is opposite from the spring 6 side in the axial direction, the outer diameter d1 of the outer cylindrical surface 7*b* needs to be smaller than the inner diameter D2 of the inner cylindrical surface 4*b* and equal to or larger than a major diameter d3 of the male-threaded portion 7*a*, i.e., a diametrical distance between crests 7*ac* of the male-threaded portion 7*a*. This is also true in the case of the ridges 7*c* formed on the opposite side of the male-threaded portion 7*a* and the case of the tapered surface 7*d* formed on the opposite side of the male-threaded portion 7*a*.

In the third and fourth embodiments, the number of the ridges 7*c* is three. However, the number of the ridges 7*c* is not limited to three. That is, it is only required to provide at least one ridge 7*c*.

In the first embodiment, the number of the blind holes 4*c* is two, and these two blind holes 4*c* are formed at two locations of the outer peripheral surface 4*d* of the sleeve 4, which are diametrically opposed to each other, by the drill bit of the drill or the like. That is, the wall of the sleeve 4 is plastically deformed against the outer cylindrical surface 7*b* of the adjust screw 7 at the two points (fastening points) to fasten the adjust screw 7. However, the number of the fastening points is not limited to two. For example, it is possible to provide only one blind hole 4*c* in the outer peripheral surface of the sleeve 4 to have the single fastening point. Alternatively, the number of the blind holes 4*c* may be equal to or larger than three, and the these blind holes 4*c* may be arranged one after another at equal angular intervals in the circumferential direction to provide three or more fastening points. Further alternatively, the fastening may be made along the entire circumferential extent of the sleeve 4.

Furthermore, in the case where the adjust screw 7 is fastened with the two wall sections 4*cr* of the sleeve 4 like in the first embodiment, two planar surface sections may be formed to diametrically oppose each other at the sleeve 4, and corresponding punches, which correspond to the two planar surface sections, may be urged against the two planar surface sections to plastically deform the two planar surface sections against the adjust screw 7 in the radially inward direction to fasten the adjust screw 7. In the case of executing the fastening along the entire circumferential extent of the sleeve 4, an annular groove, which continuously extends in the circumferential direction all around the sleeve 4 and have a reduced radial wall thickness, may be formed in the corresponding location of the outer peripheral surface of the sleeve 4, and the wall section of the annular groove of the sleeve 4 may be plastically deformed against the adjust screw 7 in the radially inward direction to fasten the adjust screw 7 along the entire circumferential extent of the adjust screw 7.

In the first to sixth embodiments, the solenoid valve (the pressure control valve) of the present disclosure is applied as the hydraulic pressure control valve 1, which is used in the hydraulic pressure control apparatus of the automatic transmission of the vehicle. Alternatively, the solenoid valve (the pressure control valve) of the present disclosure may be applied as a hydraulic pressure control valve of a valve timing control apparatus, which controls opening/closing timing of intake valves or exhaust valves of an internal combustion engine of the vehicle. Furthermore, the solenoid valve (the pressure control valve) of the present disclosure is not limited to the hydraulic pressure control valve 1 and may be applied as a flow quantity control valve, which controls a flow quantity of a fluid (e.g., hydraulic fluid), or a flow passage change valve, which changes its communication from one flow passage to another flow passage or vice versa.

Furthermore, in the hydraulic pressure control valve 1 of the first to sixth embodiments, the spool 5, which is configured into a comb-like shape, is used as a valve element. Alternatively, any other type of valve element (e.g., a ball valve or a needle valve), which is other than the spool 5, may be used in the solenoid valve (the pressure control valve) of the present disclosure.

In the above embodiments, the rear side of the adjust screw 7, which is axially opposite from the spring 6, is uncovered, i.e., is not filled with a sealing material unlike the prior art technique. However, if desired, the sealing material may be filled on the rear side of the adjust screw 7 to further improve the sealing performance.

Additional advantages and modifications will readily occur to those skilled in the art. The present disclosure in its broader terms is therefore not limited to the specific details, representative apparatus, and illustrative examples shown and described.

What is claimed is:

1. A pressure control valve comprising:
    a valve housing that is configured into a tubular form, wherein the valve housing has a receiving hole that extends in an axial direction of the valve housing, and a female-threaded portion is formed in an inner peripheral surface of the receiving hole;
    a valve element that is received in the receiving hole and is reciprocatable in the axial direction;
    a drive device that is configured to drive the valve element in the axial direction toward one end of the receiving hole;
    a spring that urges the valve element in the axial direction toward an other end of the receiving hole, which is opposite from the one end of the receiving hole in the axial direction; and
    an adjust screw that has a male-threaded portion, which is formed in an outer peripheral surface of the adjust screw, wherein:
    the adjust screw is inserted into the receiving hole to adjust and maintain a set load of the spring in a state where the male-threaded portion is engaged with the female-threaded portion;
    the adjust screw is placed in the receiving hole on one axial side of the spring where the one end of the receiving hole is located;
    at least one wall section of the valve housing is plastically deformed in a radially inward direction and is pressed against a predetermined portion of the outer peripheral surface of the adjust screw, which is other than the male-threaded portion, to limit rotation of the adjust screw; and
    an outer diameter of the predetermined portion of the outer peripheral surface of the adjust screw is smaller than a minor diameter of the female-threaded portion of the valve housing.

2. The pressure control valve according to claim 1, wherein the predetermined portion of the adjust screw includes a cylindrical surface, which is formed in the outer peripheral surface of the adjust screw.

3. The pressure control valve according to claim 1, wherein:
    the predetermined portion of the adjust screw includes an annular ridge, which is formed in the outer peripheral surface of the adjust screw and circumferentially continuously extends all around the adjust screw;
    a width of the annular ridge, which is measured in the axial direction, progressively decreases in a radially outward direction toward an apex of the annular ridge;
    the annular ridge has:
        a first side surface located on a first side of the apex that is opposite from the spring in the axial direction; and
        a second side surface located on a second side of the apex that is opposite from the first side of the apex in the axial direction;
    the first side surface defines a first predetermined angle relative to an imaginary perpendicular line, which is perpendicular to the axial direction and extends through a center of the apex;
    the second side surface defines a second predetermined angle relative to the imaginary perpendicular line; and
    the first predetermined angle and the second predetermined angle are different from each other.

4. The pressure control valve according to claim 3, wherein:
    the female-threaded portion has:
        a first flank located on a first side of a crest of the female-threaded portion, which is opposite from the spring in the axial direction; and
        a second flank located on a second side of the crest of the female-threaded portion, which is opposite from the first side of the crest of the female-threaded portion in the axial direction;
    the male-threaded portion has:
        a first flank located on a first side of a crest of the male-threaded portion, which is opposite from the spring in the axial direction; and
        a second flank located on a second side of the crest of the male-threaded portion, which is opposite from the first side of the crest of the male-threaded portion in the axial direction; and
    the first predetermined angle of the first side surface of the annular ridge is set to be larger than the second predetermined angle of the second side surface of the annular ridge to urge the second flank of the male-threaded portion against the first flank of the female-threaded portion in the axial direction at the time of plastically deforming the at least one wall section of the valve housing in the radially inward direction against the annular ridge in a state where a first force, which is applied to the adjust screw toward the spring in the axial direction to adjust the set load of the spring, is larger than a second force, which is applied to the adjust screw away from the spring in the axial direction.

5. The pressure control valve according to claim 3, wherein:
the female-threaded portion has:
a first flank located on a first side of a crest of the female-threaded portion, which is opposite from the spring in the axial direction; and
a second flank located on a second side of the crest of the female-threaded portion, which is opposite from the first side of the crest of the female-threaded portion in the axial direction;
the male-threaded portion has:
a first flank located on a first side of a crest of the male-threaded portion, which is opposite from the spring in the axial direction; and
a second flank located on a second side of the crest of the male-threaded portion, which is opposite from the first side of the crest of the male-threaded portion in the axial direction; and
the second predetermined angle of the second side surface of the annular ridge is set to be larger than the first predetermined angle of the first side surface of the annular ridge to urge the first flank of the male-threaded portion against the second flank of the female-threaded portion in the axial direction at the time of plastically deforming the at least one wall section of the valve housing in the radially inward direction against the annular ridge in a state where a first force, which is applied to the adjust screw toward the spring in the axial direction to adjust the set load of the spring, is smaller than a second force, which is applied to the adjust screw away from the spring in the axial direction.

6. The pressure control valve according to claim 3, wherein an outer diameter of the annular ridge is equal to or smaller than a minor diameter of the female-threaded portion.

7. The pressure control valve according to claim 3, wherein the annular ridge is one of a plurality of annular ridges, which are formed in the outer peripheral surface of the adjust screw and are placed one after another in the axial direction.

8. The pressure control valve according to claim 1, wherein the predetermined portion of the adjust screw includes a tapered surface, which is formed in the outer peripheral surface of the adjust screw and is tapered in the axial direction.

9. The pressure control valve according to claim 8, wherein:
the female-threaded portion has:
a first flank located on a first side of a crest of the female-threaded portion, which is opposite from the spring in the axial direction; and
a second flank located on a second side of the crest of the female-threaded portion, which is opposite from the first side of the crest of the female-threaded portion in the axial direction;
the male-threaded portion has:
a first flank located on a first side of a crest of the male-threaded portion, which is opposite from the spring in the axial direction; and
a second flank located on a second side of the crest of the male-threaded portion, which is opposite from the first side of the crest of the male-threaded portion in the axial direction; and
an outer diameter of the tapered surface progressively increases in the axial direction toward the spring to urge the second flank of the male-threaded portion against the first flank of the female-threaded portion in the axial direction at the time of plastically deforming the at least one wall section of the valve housing in the radially inward direction against the tapered surface in a state where a first force, which is applied to the adjust screw toward the spring in the axial direction to adjust the set load of the spring, is larger than a second force, which is applied to the adjust screw away from the spring in the axial direction.

10. The pressure control valve according to claim 8, wherein:
the female-threaded portion has:
a first flank located on a first side of a crest of the female-threaded portion, which is opposite from the spring in the axial direction; and
a second flank located on a second side of the crest of the female-threaded portion, which is opposite from the first side of the crest of the female-threaded portion in the axial direction;
the male-threaded portion has:
a first flank located on a first side of a crest of the male-threaded portion, which is opposite from the spring in the axial direction; and
a second flank located on a second side of the crest of the male-threaded portion, which is opposite from the first side of the crest of the male-threaded portion in the axial direction; and
an outer diameter of the tapered surface progressively decreases in the axial direction toward the spring to urge the first flank of the male-threaded portion against the second flank of the female-threaded portion in the axial direction at the time of plastically deforming the at least one wall section of the valve housing in the radially inward direction against the tapered surface in a state where a first force, which is applied to the adjust screw toward the spring in the axial direction to adjust the set load of the spring, is smaller than a second force, which is applied to the adjust screw away from the spring in the axial direction.

11. The pressure control valve according to claim 1, wherein:
at least one blind hole is radially inwardly recessed in an outer peripheral surface of the valve housing; and
the at least one wall section is formed in the at least one blind hole.

12. The pressure control valve according to claim 1, wherein:
the at least one wall section includes a first wall section and a second wall section, which are diametrically opposed to each other.

13. The pressure control valve according to claim 1, wherein:
the female-threaded portion has:
a first flank located on a first side of a crest of the female-threaded portion, which is opposite from the spring in the axial direction; and a second flank located on a second side of the crest of the female-threaded portion, which is opposite from the first side of the crest of the female-threaded portion in the axial direction;

the male-threaded portion has:

a first flank located on a first side of a crest of the male-threaded portion, which is opposite from the spring in the axial direction; and a second flank located on a second side of the crest of the male-threaded portion, which is opposite from the first side of the crest of the male-threaded portion in the axial direction; and the first flank of the female-threaded portion contacts the second flank of the male-threaded portion.

14. The pressure control valve according to claim 1, wherein:

the female-threaded portion has:

a first flank located on a first side of a crest of the female-threaded portion, which is opposite from the spring in the axial direction; and a second flank located on a second side of the crest of the female-threaded portion, which is opposite from the first side of the crest of the female-threaded portion in the axial direction;

the male-threaded portion has:

a first flank located on a first side of a crest of the male-threaded portion, which is opposite from the spring in the axial direction; and a second flank located on a second side of the crest of the male-threaded portion, which is opposite from the first side of the crest of the male-threaded portion in the axial direction; and the second flank of the female-threaded portion contacts the first flank of the male-threaded portion.

15. A pressure control valve comprising:

a valve housing that is configured into a tubular form, wherein the valve housing has a receiving hole that extends in an axial direction of the valve housing, and a female-threaded portion is formed in an inner peripheral surface of the receiving hole;

a valve element that is received in the receiving hole and is reciprocatable in the axial direction;

a drive device that is configured to drive the valve element in the axial direction toward one end of the receiving hole;

a spring that urges the valve element in the axial direction toward an other end of the receiving hole, which is opposite from the one end of the receiving hole in the axial direction; and an adjust screw that has a male-threaded portion, which is formed in an outer peripheral surface of the adjust screw, wherein:

the adjust screw is inserted into the receiving hole to adjust and maintain a set load of the spring in a state where the male-threaded portion is engaged with the female-threaded portion;

the adjust screw is placed in the receiving hole on one axial side of the spring where the one end of the receiving hole is located;

at least one wall section of the valve housing is plastically deformed in a radially inward direction and is pressed against a predetermined portion of the outer peripheral surface of the adjust screw, which is other than the male-threaded portion, to limit rotation of the adjust screw; and the predetermined portion of the outer peripheral surface of the adjust screw, against which the at least one wall section of the valve housing is plastically deformed and is pressed, is a smooth cylinder.

* * * * *